United States Patent
Chhabra et al.

(10) Patent No.: US 12,518,026 B2
(45) Date of Patent: Jan. 6, 2026

(54) STORAGE ENCRYPTION USING CONVERGED CRYPTOGRAPHIC ENGINE

(71) Applicant: Intel Corporation, Santa Clara, CA (US)

(72) Inventors: Siddhartha Chhabra, Portland, OR (US); Prashant Dewan, Portland, OR (US); Baiju Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 796 days.

(21) Appl. No.: 17/133,627

(22) Filed: Dec. 23, 2020

(65) Prior Publication Data

US 2022/0198027 A1 Jun. 23, 2022

(51) Int. Cl.
*G06F 12/02* (2006.01)
*G06F 12/14* (2006.01)
(Continued)

(52) U.S. Cl.
CPC ........ *G06F 21/602* (2013.01); *G06F 12/0238* (2013.01); *G06F 12/1408* (2013.01);
(Continued)

(58) Field of Classification Search
CPC ........ G06F 21/10; G06F 21/107; G06F 21/60; G06F 21/602; G06F 21/62; G06F 21/6209; G06F 21/70; G06F 21/78; G06F 21/79; G06F 15/76; G06F 15/78; G06F 15/7807; G06F 12/02; G06F 12/0223; G06F 12/023; G06F 12/0238; G06F 12/14; G06F 12/1408; G06F 13/14; G06F 13/20;
(Continued)

(56) References Cited

U.S. PATENT DOCUMENTS 7,093,288 B1 8/2006 Hydrie et al.
7,191,341 B2 3/2007 Paaske et al.
(Continued)

FOREIGN PATENT DOCUMENTS

CN 114647858 A 6/2022
CN 115525335 A 12/2022
(Continued)

OTHER PUBLICATIONS

International Search Report and Written Opinion issued on Jun. 30, 2022 for PCT/US2022/021531.
(Continued)

*Primary Examiner* — D'Arcy Winston Straub
(74) *Attorney, Agent, or Firm* — NICHOLSON DE VOS WEBSTER & ELLIOTT LLP

(57) ABSTRACT

Methods and apparatus relating to a Converged Cryptographic Engine (CCE) for storage encryption are described. In an embodiment, decode circuitry decodes an instruction to determine whether Converged Cryptographic Engine (CCE) circuitry is enabled. Execution circuitry executes the instruction to program a plurality of keys in response to the CCE circuitry being enabled. The CCE circuitry performs all encryption and all decryption of data to be transferred between a memory and a storage device based at least in part on at least one of the plurality of keys. Other embodiments are also disclosed and claimed.

18 Claims, 14 Drawing Sheets

(51) Int. Cl.
*G06F 13/28* (2006.01)
*G06F 15/78* (2006.01)
*G06F 21/60* (2013.01)
*G06F 21/62* (2013.01)
*G06F 21/79* (2013.01)
*G06F 21/10* (2013.01)

(52) U.S. Cl.
CPC .......... *G06F 13/28* (2013.01); *G06F 15/7807* (2013.01); *G06F 21/6209* (2013.01); *G06F 21/79* (2013.01); *G06F 21/107* (2023.08); *G06F 2212/1052* (2013.01); *G06F 2212/222* (2013.01)

(58) Field of Classification Search
CPC ............. G06F 13/28; G06F 2212/1052; G06F 2212/22; G06F 2212/222
See application file for complete search history.

(56) References Cited

U.S. PATENT DOCUMENTS

| | | | |
|---|---|---|---|
| 7,287,140 | B1 | 10/2007 | Asanovic et al. |
| 8,261,068 | B1 | 9/2012 | Raizen et al. |
| 8,494,155 | B1 | 7/2013 | Poo et al. |
| 8,516,269 | B1 | 8/2013 | Hamlet et al. |
| 8,694,778 | B2 | 4/2014 | Teuwen et al. |
| 8,819,685 | B2 | 8/2014 | Zhang et al. |
| 8,850,225 | B2 | 9/2014 | Noehring et al. |
| 8,954,788 | B2 | 2/2015 | Abraham et al. |
| 9,064,135 | B1 | 6/2015 | Poo et al. |
| 9,100,427 | B2 | 8/2015 | Dubrovsky et al. |
| 9,251,380 | B1 | 2/2016 | Au et al. |
| 9,525,671 | B1 | 12/2016 | Worsley |
| 9,584,329 | B1 | 2/2017 | Trimberger |
| 9,674,090 | B2 | 6/2017 | Caulfield et al. |
| 9,721,113 | B2 * | 8/2017 | Park ................... G06F 21/805 |
| 9,798,900 | B2 | 10/2017 | Oh et al. |
| 9,892,265 | B1 | 2/2018 | Tripathy et al. |
| 10,078,754 | B1 | 9/2018 | Brandwine et al. |
| 10,193,701 | B2 | 1/2019 | Kim et al. |
| 10,521,618 | B1 | 12/2019 | Zhang et al. |
| 10,742,421 | B1 | 8/2020 | Wentz et al. |
| 10,896,267 | B2 * | 1/2021 | Ndu ................... G06F 12/1408 |
| 10,956,346 | B1 | 3/2021 | Ben-Yehuda et al. |
| 10,999,263 | B2 | 5/2021 | Mundra et al. |
| 11,126,733 | B2 | 9/2021 | Pappachan et al. |
| 11,205,003 | B2 | 12/2021 | Patel et al. |
| 11,321,459 | B2 | 5/2022 | Shen et al. |
| 11,477,125 | B2 | 10/2022 | Browne et al. |
| 11,720,672 | B2 | 8/2023 | Shen |
| 2002/0097724 | A1 | 7/2002 | Halme et al. |
| 2002/0129246 | A1 | 9/2002 | Blumenau et al. |
| 2003/0126468 | A1 | 7/2003 | Markham |
| 2004/0123121 | A1 | 6/2004 | Paaske et al. |
| 2004/0158711 | A1 | 8/2004 | Zimmer |
| 2005/0021986 | A1 | 1/2005 | Graunke et al. |
| 2005/0108532 | A1 | 5/2005 | Bajikar |
| 2005/0232415 | A1 | 10/2005 | Little et al. |
| 2006/0181942 | A1 | 8/2006 | Cordero et al. |
| 2006/0193470 | A1 | 8/2006 | Williams et al. |
| 2007/0180239 | A1 | 8/2007 | Fujibayashi et al. |
| 2008/0002590 | A1 | 1/2008 | Thomas et al. |
| 2008/0005706 | A1 | 1/2008 | Sharma et al. |
| 2008/0063197 | A1 | 3/2008 | Jaquette et al. |
| 2008/0065882 | A1 | 3/2008 | Goodman et al. |
| 2008/0072071 | A1 | 3/2008 | Forehand et al. |
| 2008/0222383 | A1 | 9/2008 | Spracklen et al. |
| 2010/0005375 | A1 | 1/2010 | Dell et al. |
| 2010/0023739 | A1 | 1/2010 | Levit-Gurevich et al. |
| 2010/0054466 | A1 | 3/2010 | Kerins et al. |
| 2011/0002461 | A1 | 1/2011 | Erhart et al. |
| 2011/0060915 | A1 | 3/2011 | Tal |
| 2011/0066837 | A1 | 3/2011 | Lee et al. |
| 2011/0149737 | A1 | 6/2011 | Muthiah et al. |
| 2011/0320921 | A1 | 12/2011 | Gower et al. |
| 2012/0008768 | A1 | 1/2012 | Mundra et al. |
| 2012/0030669 | A1 | 2/2012 | Tsirkin |
| 2012/0054455 | A1 | 3/2012 | Wang et al. |
| 2012/0072737 | A1 | 3/2012 | Schrijen et al. |
| 2012/0084674 | A1 | 4/2012 | Visosky |
| 2012/0137137 | A1 | 5/2012 | Brickell et al. |
| 2012/0144205 | A1 | 6/2012 | Shu et al. |
| 2012/0151224 | A1 | 6/2012 | Koifman et al. |
| 2012/0151247 | A1 | 6/2012 | Ferraiolo et al. |
| 2012/0254862 | A1 | 10/2012 | Dong |
| 2013/0013934 | A1 | 1/2013 | King et al. |
| 2013/0151761 | A1 | 6/2013 | Kim et al. |
| 2013/0152099 | A1 | 6/2013 | Bass et al. |
| 2014/0022976 | A1 | 1/2014 | Chao et al. |
| 2014/0059681 | A1 | 2/2014 | Dubrovsky et al. |
| 2014/0079220 | A1 | 3/2014 | Wei et al. |
| 2014/0089658 | A1 | 3/2014 | Raghuram et al. |
| 2014/0093074 | A1 | 4/2014 | Gotze et al. |
| 2014/0122902 | A1 | 5/2014 | Isozaki et al. |
| 2014/0133845 | A1 | 5/2014 | Dahlfort et al. |
| 2014/0136680 | A1 | 5/2014 | Joshi et al. |
| 2014/0258716 | A1 | 9/2014 | MacMillan et al. |
| 2014/0270177 | A1 | 9/2014 | Brickell et al. |
| 2014/0281456 | A1 | 9/2014 | Mejia et al. |
| 2014/0310536 | A1 | 10/2014 | Shacham |
| 2014/0359182 | A1 | 12/2014 | Georgiev |
| 2015/0046702 | A1 * | 2/2015 | Paaske ................... G06F 21/602 713/160 |
| 2015/0188718 | A1 | 7/2015 | Falk |
| 2015/0270956 | A1 | 9/2015 | Basmov et al. |
| 2015/0288526 | A1 | 10/2015 | Mclean et al. |
| 2015/0350231 | A1 | 12/2015 | Dubrovsky et al. |
| 2015/0381459 | A1 | 12/2015 | Xiao et al. |
| 2016/0019396 | A1 | 1/2016 | Davis et al. |
| 2016/0094650 | A1 | 3/2016 | Garcia De et al. |
| 2016/0139982 | A1 * | 5/2016 | Yu ...................... G06F 12/0246 714/768 |
| 2016/0246967 | A1 | 8/2016 | Gross et al. |
| 2016/0323096 | A1 | 11/2016 | Kara-Ivanov et al. |
| 2016/0364343 | A1 | 12/2016 | Case et al. |
| 2016/0364582 | A1 | 12/2016 | Cammarota et al. |
| 2017/0022494 | A1 | 1/2017 | Hill et al. |
| 2017/0026171 | A1 * | 1/2017 | Lal ...................... H04L 9/0822 |
| 2017/0090815 | A1 * | 3/2017 | Kelner ................. G06F 3/0647 |
| 2017/0091489 | A1 | 3/2017 | Dragone et al. |
| 2017/0093567 | A1 | 3/2017 | Gopal et al. |
| 2017/0134409 | A1 | 5/2017 | Dubrovsky et al. |
| 2017/0149572 | A1 | 5/2017 | Wallrabenstein |
| 2017/0180272 | A1 | 6/2017 | Bernath |
| 2017/0214612 | A1 | 7/2017 | Leitner et al. |
| 2017/0220494 | A1 | 8/2017 | Shacham et al. |
| 2018/0088978 | A1 | 3/2018 | Li et al. |
| 2018/0095750 | A1 | 4/2018 | Drysdale et al. |
| 2018/0107608 | A1 | 4/2018 | Kaplan et al. |
| 2018/0124085 | A1 | 5/2018 | Frayman et al. |
| 2018/0189104 | A1 | 7/2018 | Agarwal et al. |
| 2018/0204007 | A1 | 7/2018 | Rangayyan |
| 2018/0365451 | A1 * | 12/2018 | Ndu ...................... G06F 21/78 |
| 2018/0367516 | A1 | 12/2018 | Mundra et al. |
| 2019/0004973 | A1 | 1/2019 | Chhabra et al. |
| 2019/0042474 | A1 * | 2/2019 | Edirisooriya ......... G06F 3/0634 |
| 2019/0075075 | A1 | 3/2019 | Silberkasten et al. |
| 2019/0097818 | A1 | 3/2019 | Lu et al. |
| 2019/0102293 | A1 | 4/2019 | Li et al. |
| 2019/0102568 | A1 | 4/2019 | Hausauer et al. |
| 2019/0102577 | A1 | 4/2019 | Gueron et al. |
| 2019/0108130 | A1 | 4/2019 | Durham et al. |
| 2019/0116052 | A1 | 4/2019 | Kim et al. |
| 2019/0130103 | A1 | 5/2019 | Shen et al. |
| 2019/0149478 | A1 | 5/2019 | Mchugh et al. |
| 2019/0165956 | A1 | 5/2019 | Adham et al. |
| 2019/0165957 | A1 | 5/2019 | Abbott et al. |
| 2019/0190892 | A1 | 6/2019 | Menachem et al. |
| 2019/0227827 | A1 | 7/2019 | Zmudzinski et al. |
| 2019/0281025 | A1 | 9/2019 | Harriman et al. |
| 2019/0311123 | A1 | 10/2019 | Lal et al. |
| 2019/0324725 | A1 | 10/2019 | Wang |
| 2019/0342093 | A1 * | 11/2019 | Chhabra ................ H04L 9/0894 |

(56) References Cited

U.S. PATENT DOCUMENTS

| | | |
|---|---|---|
| 2019/0361807 A1 | 11/2019 | Desai et al. |
| 2020/0013451 A1 | 1/2020 | Son |
| 2020/0034549 A1 | 1/2020 | Lu |
| 2020/0052892 A1 | 2/2020 | Chhabra et al. |
| 2020/0099658 A1 | 3/2020 | Couillard et al. |
| 2020/0110888 A1 | 4/2020 | Kim et al. |
| 2020/0127861 A1 | 4/2020 | Doshi et al. |
| 2020/0134208 A1 | 4/2020 | Pappachan et al. |
| 2020/0143067 A1 | 5/2020 | Alemzadeh et al. |
| 2020/0159969 A1 | 5/2020 | Shanbhogue et al. |
| 2020/0175646 A1 | 6/2020 | Boyd et al. |
| 2020/0192842 A1 | 6/2020 | Ng et al. |
| 2020/0226263 A1 | 7/2020 | Patel et al. |
| 2020/0266995 A1 | 8/2020 | Gopal |
| 2020/0272562 A1 | 8/2020 | La Fratta et al. |
| 2020/0285492 A1 | 9/2020 | Mihajlovski et al. |
| 2020/0319913 A1 | 10/2020 | Kumar et al. |
| 2020/0342117 A1 | 10/2020 | Richards et al. |
| 2020/0387404 A1 | 12/2020 | Baxter et al. |
| 2020/0389433 A1 | 12/2020 | Zivic et al. |
| 2021/0004338 A1 | 1/2021 | Marolia et al. |
| 2021/0064549 A1 | 3/2021 | Zhang et al. |
| 2021/0149728 A1 | 5/2021 | Wood et al. |
| 2021/0157935 A1 | 5/2021 | Sood et al. |
| 2021/0224202 A1 | 7/2021 | Chhabra et al. |
| 2021/0232694 A1* | 7/2021 | Jannyavula Venkata ............ H04L 9/32 |
| 2021/0318966 A1 | 10/2021 | Chhabra et al. |
| 2021/0319121 A1 | 10/2021 | Dewan et al. |
| 2021/0319138 A1 | 10/2021 | Dewan et al. |
| 2021/0342182 A1 | 11/2021 | Kumar et al. |
| 2021/0365394 A1 | 11/2021 | Lu et al. |
| 2021/0382836 A1 | 12/2021 | Lantz et al. |
| 2022/0035749 A1 | 2/2022 | Chhabra et al. |
| 2022/0100687 A1 | 3/2022 | Sahin et al. |
| 2022/0182232 A1 | 6/2022 | Marson et al. |
| 2022/0197825 A1 | 6/2022 | Dewan et al. |
| 2022/0198027 A1 | 6/2022 | Chhabra et al. |
| 2022/0209966 A1 | 6/2022 | Chhabra et al. |
| 2022/0209967 A1 | 6/2022 | Chhabra et al. |
| 2022/0209968 A1 | 6/2022 | Chhabra et al. |
| 2022/0209969 A1 | 6/2022 | Chhabra et al. |
| 2022/0231991 A1 | 7/2022 | Blum Shem-Tov et al. |
| 2022/0276893 A1 | 9/2022 | Wood et al. |
| 2022/0318144 A1 | 10/2022 | Bajic et al. |
| 2022/0350503 A1 | 11/2022 | Tkacik et al. |
| 2022/0416997 A1 | 12/2022 | Dewan et al. |
| 2022/0417042 A1 | 12/2022 | Chhabra et al. |
| 2023/0032236 A1 | 2/2023 | Sankaran et al. |
| 2023/0032586 A1 | 2/2023 | Ranganathan et al. |
| 2023/0102178 A1 | 3/2023 | Chhabra et al. |
| 2023/0153159 A1 | 5/2023 | Kelkar et al. |
| 2024/0004990 A1 | 1/2024 | Kakaiya |
| 2024/0039860 A1 | 2/2024 | Arvind et al. |
| 2024/0054011 A1 | 2/2024 | Sankaran et al. |

FOREIGN PATENT DOCUMENTS

| | | |
|---|---|---|
| CN | 115686740 A | 2/2023 |
| CN | 117083612 A | 11/2023 |
| DE | 102022112551 A1 | 12/2022 |
| EP | 3547130 A1 | 10/2019 |
| EP | 3720084 A1 | 10/2020 |
| EP | 3757849 A1 | 12/2020 |
| EP | 3757853 A1 | 12/2020 |
| EP | 4016358 A1 | 6/2022 |
| EP | 4124965 A1 | 2/2023 |
| EP | 4152167 A1 | 3/2023 |
| EP | 4242893 A2 | 9/2023 |
| EP | 3726392 A1 | 10/2023 |
| EP | 4322006 A1 | 2/2024 |
| GB | 2578135 A | 4/2020 |
| JP | 2021064378 A | 10/2022 |
| NL | 2029658 A | 7/2022 |
| WO | 2011160957 A1 | 12/2011 |
| WO | 2019066918 A1 | 4/2019 |
| WO | 2021035517 A1 | 3/2021 |
| WO | 2021080732 A1 | 4/2021 |
| WO | 2021162792 A1 | 8/2021 |
| WO | 2022132184 A1 | 6/2022 |
| WO | PCTUS2238546 | 7/2022 |
| WO | WO2023009641 | 7/2022 |
| WO | 2023009641 A1 | 2/2023 |
| WO | 2023113918 A1 | 6/2023 |

OTHER PUBLICATIONS

U.S. Appl. No. 17/711,928, filed Apr. 1, 2022, Narayan Ranganathan.
U.S. Appl. No. 17/854,322, filed Jun. 30, 2022, Utkarsha Y. Kakaiya.
Search report issued by the Dutch patent office per EPO report (application 2029658), dated Mar. 22, 2023, 11 pages (with machine translation of cover letter).
U.S. Appl. No. 17/478,828, filed Sep. 17, 2021, Anand K. Enamandram.
GDSII, retrieved from https://en.wikipedia.org/w/index.php?title=GDSII&oldid=1003588402 on Jun. 15, 2021.
European Search Report for application No. 22188217.8-1203, issued Feb. 3, 2023, 16 pages.
European Search Report, Application No. EP22181090, issued Dec. 7, 2022, 7 pages.
Extended European Search Report for application No. 22188217.8, issued May 8, 2023, 13 pages.
European Examination Report for app. No. 21198475.2, issued Jan. 4, 2024, 5 pages.
U.S. Appl. No. 17/551,166, filed Dec. 14, 2021, Saurabh Gayen.
U.S. Appl. No. 17/854,159, filed Jun. 30, 2022, Utkarsh Y. Kakaiya.
U.S. Appl. No. 17/875,198, filed Jul. 27, 2022, Rajesh M. Sankaran.
Unterluggauer T, Werner M, Mangard S. MEAS: memory encryption and authentication secure against side-channel attacks. J Cryptogr Eng. 2019;9(2):137-158. doi: 10.1007/s13389-018-0180-2. Epub Jan. 25, 2018. PMID: 31231603; PMCID: PMC6555441.
IBM Cloud Education, "What is Multi-Tenant?" IBM Cloud Learn Hub, retrieved on Dec. 2, 2021 from https://www.IBM.com/cloud/learn/multi-tenant.
Ionos, Hyperscale Computing—load balancing for large quantities of data, Aug. 24, 2020, downloaded Sep. 2, 2021, 8 pages.
Tyer, Shyamkumar, "Introducing Smart Data Acceleration Interface (SDXI)," In-Memory Computing Summit (Oct. 28, 2020).
Written Opinion for application No. PCT/US2022/047184, issued Feb. 15, 2023, 6 pages.
Written Opinion of the International Searching Authority for International application No. PCT/US2022/038546, mailed Nov. 18, 2022, 5 pages.
Intel Corporation. Intel® Architecture Memory Encryption Technologies Specification. Rev 1.1. Dec. 2017. (Year: 2017).
International Search Report for application No. PCT/US2022/047184, issued Feb. 15, 2023, 3 pages.
International Search Report for International application No. PCT/US2022/038546, mailed Nov. 18, 2022, 4 pages.
Jiang, David, "Introducing the Intel Data Streaming Accelerator (Intel DSA)," retrieved on Dec. 1, 2021 from https://01.org/blogs/2019/introducing-intel-data-streaming-accelerator.
J. Zhu et al., "Enabling Rack-scale Confidential Computing using Heterogeneous Trusted Execution Environment," 2020 IEEE Symposium on Security and Privacy (SP), 2020, pp. 1450-1465.
V. Krishnan, O. Serres and M. Blocksome, "COnfigurable Network Protocol Accelerator (COPA): An Integrated Networking/Accelerator Hardware/Software Framework," 2020 IEEE Symposium on High-Performance Interconnects (HOTI), 2020, pp. 17-24.
"Intel Data Streaming Accelerator Architecture Specification," Revision 1.2, 197 pages, Sep. 2021.
"Intel® QuickAssist Technology (Intel® QAT)—Data Center Performance," downloaded Jun. 12, 2022, from "https://www.intel.com/content/www/us/en/architecture-and-technology/intel-quick-assist-technology-overview.html," 6 pages.
"Smart Data Accelerator Interface ("SDXI") Specification," Version 0.9.0 rev 1, SNIA Advancing Storage & Information Technology, 109 pages.

(56) References Cited

OTHER PUBLICATIONS

C. Priebe, K. Vaswani and M. Costa, "EnclaveDB: A Secure Database Using SGX," 2018 IEEE Symposium on Security and Privacy (SP), San Francisco, CA, USA, 2018, pp. 264-278.
M. Werner, T. Unterluggauer, R. Schilling, D. Schaffenrath and S. Mangard, "Transparent memory encryption and authentication," 2017 27th International Conference on Field Programmable Logic and Applications (FPL), Ghent, Belgium, 2017, pp. 1-6.
Partial European Search Report for application No. 23156058.2, issued Jul. 26, 2023, 14 pages.
Wikipedia, "Disk encryption theory," downloaded from "https://en.wikipedia.org/wiki/Disk_encryption_theory#XTS" on Jul. 25, 2023, 7 pages.
International Search Report and Written Opinion issued on Jun. 24, 2022 for PCT/US2022/021446.
Extended European Search Report issued on Feb. 28, 2022 for EP Application No. 21198475.2.
International Preliminary Report on Patentability for application No. PCT/US2020/066279, issued Jun. 13, 2023, 11 pages.
Notice of Grant of NL application No. 2029658, Dutch Patent No. 2029658, issued Jun. 13, 2023, 6 pages.
Intel® Architecture Memory Encryption Technologies Specification, Revision 1.3, Apr. 2021.
Samsung Unveils Industry—First Memory Module Incorporating New CXL interconnect Standard, May 11, 2021, downloaded Jun. 13, 2021, from https://news.samsung.com, 5 pages.
Extended European Search Report for Application No. 22188184.0-1224, issued Jan. 25, 2023, 8 pages.
U.S. Appl. No. 17/357,973, filed Jun. 24, 2021, Prashant Dewan.
U.S. Appl. No. 17/358,238, filed Jun. 25, 2021, Siddhartha Chhabra.
Gunlu, Onur, et al. "Secure and Reliable Key Agreement with Physical Unclonable Functions," Entropy 2018, vol. 20, May 3, 2018, pp. 1-19.
Intel Architecture Memory Encryption Technologies, Apr. 2021.
International Search Report and Written Opinion issued by KIPO on Oct. 28, 2021 for corresponding PCT/US2020/066279, 18 pages.
Notice of Allowance issued on Aug. 30, 2021 for U.S. Appl. No. 16/832,138.
European Search Report for application No. 23156058.2, issued Oct. 26, 2023, 13 pages.
J. Won, A. Singla, E. Bertino and G. Bollella, "Decentralized Public Key Infrastructure for Internet-of-Things," MILCOM 2018—2018 IEEE Military Communications Conference (MILCOM), Los Angeles, CA, USA, 2018, pp. 907-913.
Jack Keil Wolf, an introduction to error correcting codes, Part 1, ECE 154C, Spring 2008, 146 pages.
Smart Data Accelerator Interface ("SDXI") Specification, Version 1.0, SNIA, Nov. 28, 2022, 144 pages.
Intel Data Streaming Accelerator Architecture Specification, Revision 2.0, Sep. 2022, 253 pages.
Intel Scalable I/O Virtualization, Technical Specification, Rev. 1.1, Sep. 2020, 29 pages.
Intel TDX Connect Architecture Specification, Mar. 2023, 40 pages.
Zhao et al., "Contiguitas: The Pursuit of Physical Memory Contiguity in Datacenters," Jun. 2023, 15 pages.
"Intel Data Streaming Accelerator Preliminary Architecture Specification," retrieved from https://software.intel.com/sites/default/files/341204-intel-data-streaming-accelerator-spec-pdf on May 6, 2020, revision 1.0, Nov. 2019, 125 pages.
Extended European search report for application No. 23191363.3, issued Nov. 30, 2023, 11 pages.
International Preliminary Report on Patentability and Written Opinion (International app. No. PCT/US2022/021446), issued Dec. 14, 2023, 5 pages.
International Preliminary Report on Patentability and written opinion (international application No. PCT/US2022/021531), issued Dec. 14, 2023, 5 pages.
Advanced Micro Devices, "Tiered Memory Page Migration Operations Guide," publication # 58151, Revision 0.51, May 2023, 33 pages.
Final Office Action issued in U.S. Appl. No. 17/358,284 on Feb. 22, 2024, 22 pages.
European Patent Office examination report for Application No. 22188184.0, issued Jul. 22, 2024, 5 pages.
Office Action issued in U.S. Appl. No. 17/357,973, on Oct. 1, 2024, 14 pages.
European Examination Report for application No. 22181090.6, issued Oct. 9, 2024, 7 pages.
International Search Report for application No. PCT/CN2022/080895, 4 pages.
Non-final office action for U.S. Appl. No. 17/358,238, mailed Aug. 8, 2024, 30 pages.
Non-Final Office Action issued in U.S. Appl. No. 17/478,828, mailed Oct. 31, 2024, 9 pages.
Non-Final Rejection in U.S. Appl. No. 17/483,123, mailed Nov. 25, 2024,. 9 pages.
Written Opinion for application No. PCT/CN2022/080895, mailed Nov. 28, 2022, 4 pages.
Non-Final Office Action in U.S. Appl. No. 17/711,928, mailed Aug. 26, 2024, 22 pages.
Notice of Allowance for U.S. Appl. No. 17/482,370, issued Jul. 30, 2024, 8 pages.
"Intel Data Streaming Accelerator Architecture Specification, revision 1.1," Oct. 2020, 194 pages.
"Intel Virtualization Technology for Directed I/O Architecture Specification," Jun. 2018, 275 pages.
ASIC—definition by BAE Systems (Year: 2021).
Extended European search report in application No. 22850259.7, issued Jan. 27, 2025, 9 pages.
Final Office Action issued in U.S. Appl. No. 17/711,928, mailed Feb. 13, 2025, 26 pages.
Final Office Action issued in U.S. Appl. No. 17/875,198, mailed Feb. 21, 2025, 44 pages.
Non-final Office Action issued in U.S. Appl. No. 17/551,166, mailed Feb. 12, 2025, 30 pages.

* cited by examiner

| Field | Offset (Bytes) | Size (Bytes) | Description |
|---|---|---|---|
| KEY_INDEX | 0 | 2 | Key Index |
| KEY_CTRL | 2 | 4 | Key control:<br>Bits [7:0]: Command<br>Bit [23:8]: ENC_ALG<br>Bits [31:24]: RSVD, MBZ |
| RSVD | 6 | 58 | RSVD, MBZ |
| KEY_FIELD_1 | 64 | 64 | Software supplied data key or entropy for data key |
| KEY_FIELD_2 | 128 | 64 | Software supplied tweak key or entropy for tweak key |

FIG. 6

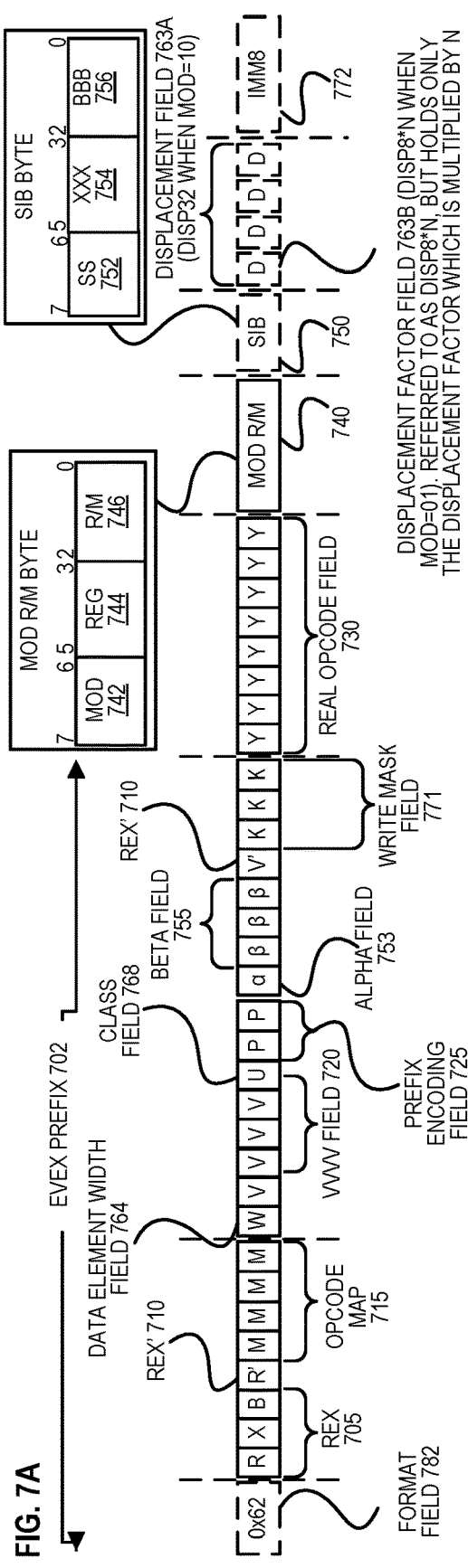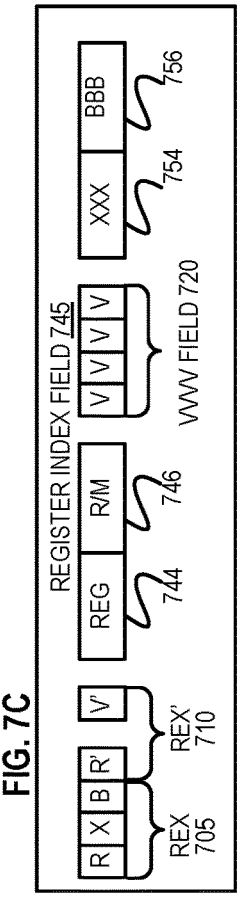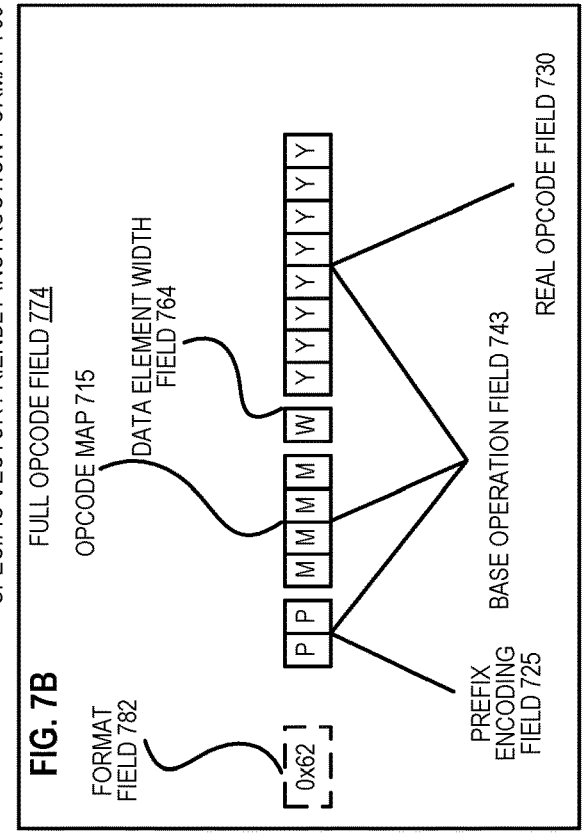

STORAGE ENCRYPTION USING CONVERGED CRYPTOGRAPHIC ENGINE

FIELD

The present disclosure generally relates to the field of electronics. More particularly, some embodiments relate to a Converged Cryptographic Engine (CCE) for storage encryption.

BACKGROUND

With growing security needs, memory cryptographic engines have become a requirement for different usage models to protect code and/or data resident in main memory. However, there may be multiple cryptographic engines present at different locations on a given platform, resulting in unnecessary power consumption and area usage as well as additional design complexity

BRIEF DESCRIPTION OF THE DRAWINGS

So that the manner in which the herein recited features of the present embodiments can be understood in detail, a more particular description of the embodiments may be had by reference to embodiments, some of which are illustrated in the appended drawings. It is to be noted, however, that the appended drawings illustrate only typical embodiments and are therefore not to be considered limiting of their scope.

FIG. 6 illustrates sample fields for key information, according to an embodiment.

FIG. 7A is a block diagram illustrating an exemplary instruction format according to embodiments.

FIG. 7B is a block diagram illustrating the fields of the instruction format that make up the full opcode field according to one embodiment.

FIG. 7C is a block diagram illustrating the fields of the instruction format that make up the register index field according to one embodiment.

DETAILED DESCRIPTION

Figure 1A:
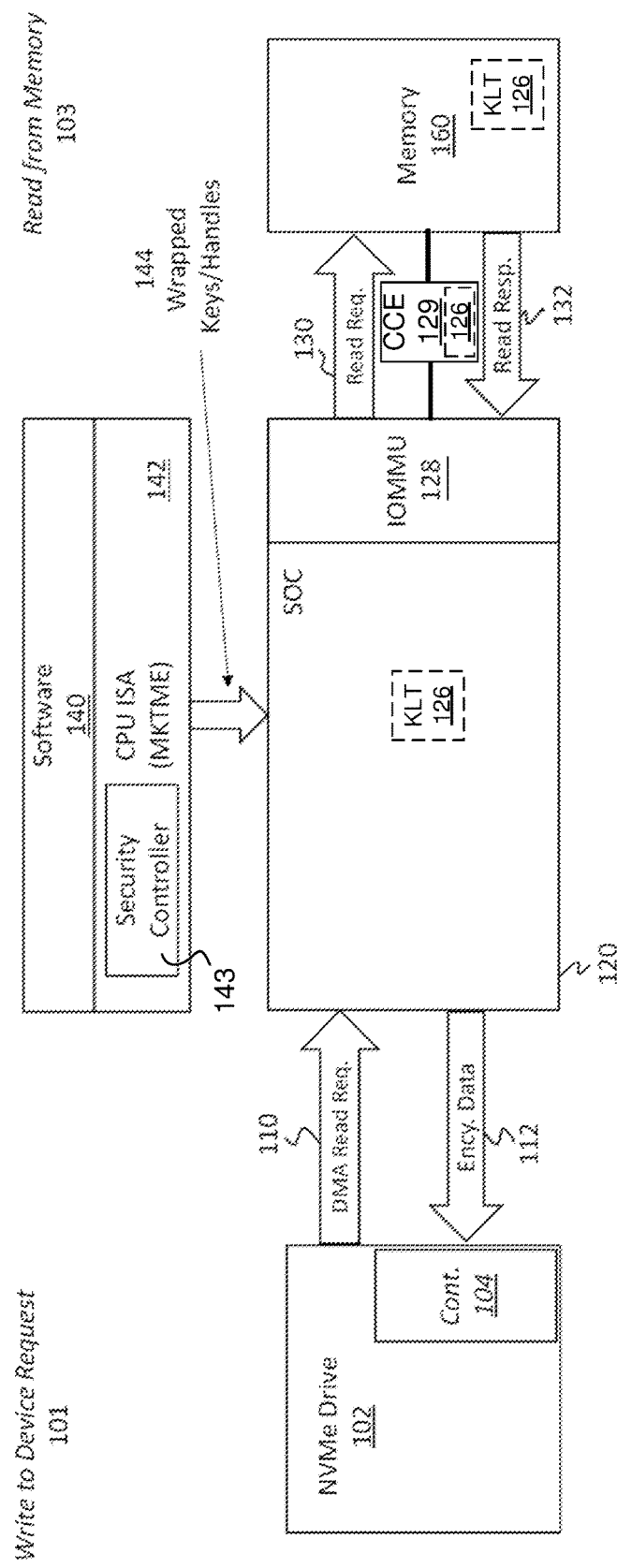
FIG. 1A illustrates block diagram for a system with a cryptographic engine on a memory path for a read from memory and write to device request, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, with growing security needs, memory cryptographic engines have become a requirement for different usage models to protect code and/or data resident in main memory. However, there may be multiple cryptographic engines present at different locations on a given platform, resulting in unnecessary power consumption and area usage as well as additional design complexity.

Non-Volatile Memory express (NVMe) drives are quickly gaining popularity in the industry. NVMe drives utilize the Peripheral Component Interface express (PCIe) protocol. In some implementations, an encryption engine dedicated to the NVMe device may be provided in the Input/Output (IO or I/O) controller (IOC). While this provides a solution which minimizes dependencies on other Intellectual Property blocks (IPs) in a System on Chip (SoC or SOC), it may also results in duplication of IPs.

To this end, some embodiments provide a Converged Cryptographic Engine (CCE) for storage encryption. In one embodiment, all cryptographic (or "crypto" for short) engines may be combined into a single engine on the memory interface. This single cryptographic engine may be interchangeably referred to herein as Multi-Key Total Memory Encryption (MKTME) engine or CCE. As a result, overall platform area usage and/or power consumption overheads can be reduced by decreasing the number of cryptographic engines. An alternative embodiment utilizes a special instruction which when executed programs one or more keys for encryption/decryption of data transferred between a storage device (such as an NVMe) and a main memory (e.g., to the main memory or DRAM such as memory 1120 of FIG. 11 and/or memory 1060 of FIG. 10). Furthermore, while the special instruction discussed with reference to some embodiments may not include prefixes, in at least one embodiment, the utilized instruction(s) may be defined to use the EVEX format (such as discussed with reference to FIGS. 7A-7C). However, embodiments are not limited to EVEX format and any instruction format may be used to implement various embodiments, e.g., with or without prefixes.

By contrast, some current implementations may utilize multiple cryptographic engines which increase the area and power overheads of a platform. Additionally, the cryptographic engines may be delivered by different design teams and, hence, the overall design cost and integration complexity is increased as well. Further, any new requirements such as side channel resistance, post-quantum resistance which are added with time require multiple IPs to be updated, resulting in duplication of work and independent maintenance which increase the overall cost to deliver cryptographic needs of a platform.

FIG. 1A illustrates block diagram for a system 100 with a cryptographic engine on a memory path for a read from memory and write to device request, according to an embodiment.

Specifically, FIG. 1A illustrates a system architecture for a write to device request 101 for NVMe device/drive 102 and read from memory 103 to read data from memory 160. NVMe drive 102 may comprise a solid state drive (SSD) which is written to 101 per the read operation 103 from memory 160. Memory 160 may comprise a Dynamic Random Access Memory (DRAM) or main memory (such as memory 1120 of FIG. 11 and/or memory 1060 of FIG. 10).

SSDs read and write data to a substrate of interconnected flash memory chips which are fabricated in silicon. NVMe SSDs have been gaining popularity due to their speed. NVMe SSDs use NVMe Host Controller Host Controller Interface Specification (NVMHCIS) (not shown) for accessing non-volatile storage media attached via PCI Express (PCIe) bus (not shown).

NVMe drive 102 may require direct memory access (DMA) to memory 160 in order to obtain data. To this end, NVMe drive 102 issues a DMA Read Request 110 to SOC 120. The DMA Read Request 110 need not be encrypted. As shown in FIG. 1A, the SOC 120 is interposed between NVMe drive 102 and memory 160. SOC 120 is shown with an Input/Output Memory Management Unit (IOMMU) 128.

Referring to FIG. 1A, CCE 129 is coupled between IOMMU 128 and memory 160. CCE 129 may implemented as logic and may comprise one or more processor circuitries and/or other components. In one embodiment, CCE 129 comprises an encryption/decryption engine configured to encrypt or decrypt data according to instructions stored in a storage device such as crypto memory circuitry and/or lookup tables. CCE 129 may also comprises a Key Lookup Table (KLT) 126. KLT 126 is a memory circuitry used to store various lookup tables as further described below. As shown in FIG. 1A, KLT 126 may be provided elsewhere in the system 100, such as within the SOC 120 and/or memory 160.

In one embodiment, CCE 129 supports AES-XTS or Advanced Encryption Standard (AES) XEX-based Tweakable-codebook mode with ciphertext Stealing (XTS) (e.g., with 256b keys) and may be programmed using a new instruction. However, embodiments are not limited to AES-XTS and other encryption protocols may also be used, such as AES Galois/Counter Mode (GCM) (or AES-GCM). Furthermore, PCONFIG instruction may be used to program the CCE 129 with AES-XTS keys in at least one embodiment.

CCE 129 may optionally include memory (not shown). This memory may comprise one or more Static Random Access Memory (SRAM) circuitries in communication with processor circuitries of CCE 129. The CCE memory circuitry may store one or more instructions to cause the one or more processor circuitries (not shown) in CCE 129 to execute a plurality of operations. These operations, my include, for example, receipt and storing of cryptographic information required to encrypt or decrypt data, forming data and/or key tables and communicating encrypted or decrypted data with components external to the SOC 120. Once formed, such tables may be stored at Key Lookup Table (KLT) 126. In an alternative embodiment, the memory inside the CCE 129 may serve as a cache to store the KLT information. For simplicity, the following exemplary embodiments reference CCE 129 generically to include encryption/decryption engine and/or local memory, where applicable.

Software 140 interfaces SOC 120 via CPU (Central Processing Unit) Instruction Set Architecture (ISA) 142. ISA 142 acts as an interface between Software 140 and SoC 120. In one embodiment, Software 140 supports multiple encryption keys. In an exemplary embodiment, Software 140 supports key management specifications for MKTME. In some embodiments, there may be four kinds of keys used including: (a) hardware generated, (b) hardware wrapped, (c) plaintext keys, and (d) no encryption key. As discussed herein, a hardware generated key is a key generated randomly by hardware using a random number generator and programmed by the key programming instruction to the hardware and a wrapped key is a key that is wrapped (or encrypted) using a Physical Unclonable Function (PUF) derived key. The key programming instruction then unwraps/decrypts the key from the wrapped blob and programs it to the hardware.

In another embodiment, Software 140 may utilize key wrap construction 144. The Key Wrap constructions are a class of symmetric encryption algorithms designed to encapsulate (encrypt) cryptographic key material. The Key Wrap algorithm is intended to protect keys while stored in an untrusted storage or when the keys are transmitted over untrusted communications networks/connections. Here, the Key Wrap/Handle construction may be optionally used as the communication is external to the SOC 120.

During an exemplary implementation NVMe driver (SSD) 102 transmits a DMA read request 110 to SOC 120. Read Request 110 is not encrypted as it contains no data. In an optional embodiment, Read Request 110 may be encrypted. Because Read Request 110 is not encrypted, CCE 129 is not engaged and SOC 120 relays the Read Request 130 (corresponding to the read request 110) to Memory 160 via IOMMU 128. Responsive to the request, Memory 160 transmits Read Response 132 to SOC 120 via IOMMU 128. CCE 129 receives data packets included in Read Response 132 and decrypts the data read from the memory 160 and then encrypts the data packets according to the disclosed embodiments prior to transmission to the IOMMU 128.

More particularly, data is encrypted according to encryption keys provided by Software 140. SOC's communication with its end points (e.g., the NVMe drive 102) may be governed by the PCIe protocol. A PCIe end point has the choice of sending any additional data in the headers. One embodiment uses the PCIe TLP prefix(s) (where TLP refers to Transaction Layer Packet) to send a table index and the offset value (e.g., for KLT 126). The CCE 129 parses and removes this prefix information and uses the index field to look up a record/entry in a table and the offset field to calculate the actual LBA (Logical Block Address) from the base LBA. Exemplary encryption (or decryption) methods are discussed further below in relation to FIG. 1B et seq.

In one embodiment, read data is selected by CCE 129 through software interface (not shown) that identifies which drives should CCE 129 encrypt and which should not be encrypted. As described further below, Key Lookup Table (KLT) 126 stores one or more tables. In one embodiment, KLT 126 provides information including KeyID, read or write (R/W) bit, LBA and File Infor (per file) to CCE 129, as will be further discussed with reference to FIG. 3.

The pertinent data provided in Read Request 132 is decrypted and then encrypted at CCE 129 and subsequently communicated (112) to NVMe 102. NVMe Controller 104 receives the encrypted data 112 and writes it to the NVMe drive 102 as indicated. Because encryption/decryption is done at the CCE 129, the entire encryption operation is done at inline DMA speed and no additional delay is introduced.

Figure 1B:
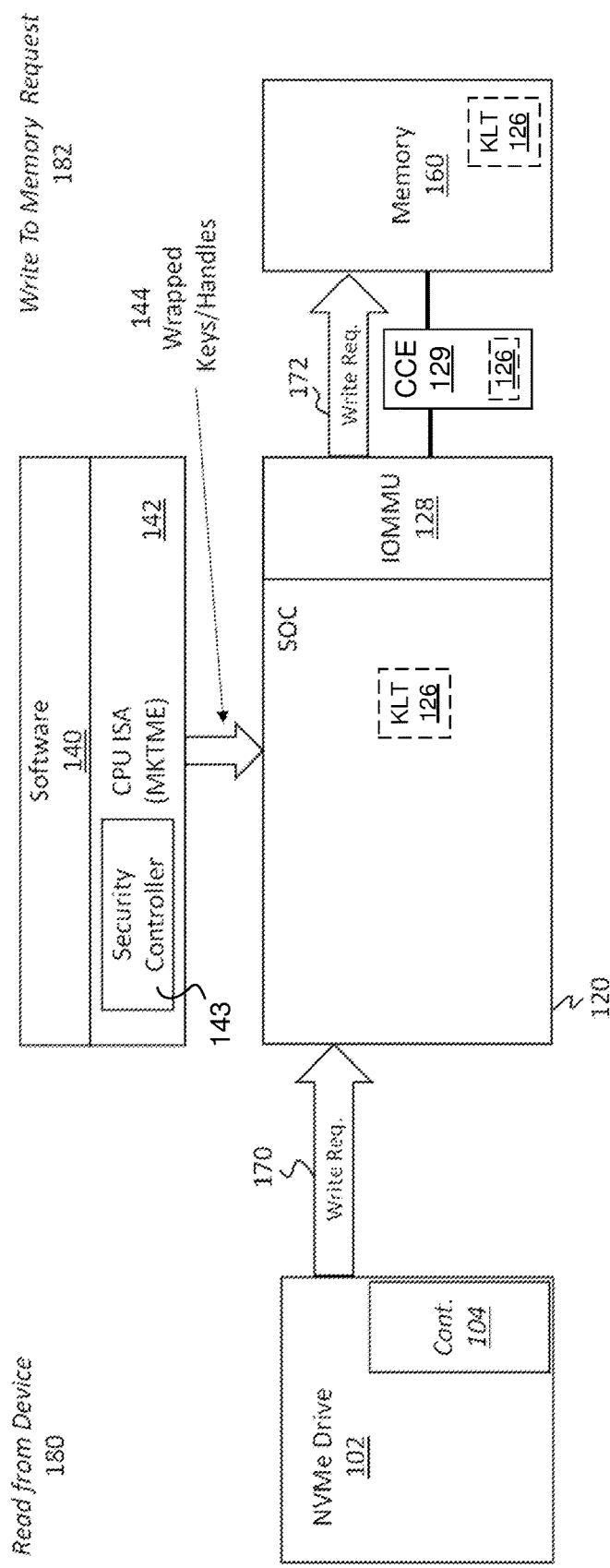
FIG. 1B illustrates block diagram for a system with a cryptographic engine on a memory path for a read from device and write to memory request, according to an embodiment.

FIG. 1B illustrates block diagram for a system 175 with a cryptographic engine on a memory path for a read from device (180) and write to memory request (182), according to an embodiment. In FIG. 1B, NVMe Drive 102 is intending to write data into memory 160. The process begins with NVMe Drive controller 104 issuing Write Request 170. Write Request 170 comprises encrypted data.

SOC 120 receives the encrypted Write Request 170 from NVMe Controller 104 and forwards it through IOMMU 128 to the CCE 129. CCE 129 decrypts the data from Write Request 170 using key information from Software 140, Key lookup table from KLT 126, and/or cypher keys from CPU ISA 142 (and/or Security Controller 143). The decrypted Write Request 172 is then transmitted to the CCE 129 to encrypt the data prior to writing to the Memory 160. Memory 160 then writes the encrypted data to allocated memory slots. Hence, referring to FIGS. 1A and 1B, data is encrypted before storage in the NVMe 102 and/or Memory 160 in one or more embodiments. CCE 129 encrypts/decrypts the data as needed and as discussed herein. One exception could be the DMA requests that may contain no payload data and their content only assists in addressing which does not need to be encrypted.

Hence, some embodiments collapse the cryptographic engines for the core memory protection and Total Storage encryption (TSE) or storage/NVMe encryption to a single engine on the memory interface, the CCE. Hence, while MKTME may refer to a memory encryption engine, CCE refers to a memory encryption engine supplemented with TSE capability in the same IP bock. In one embodiment, a new mode for the CCE is referred to as double Xcrypt (DX) mode where data written to memory (160) for a disk read operation (e.g., from NVMe drive 102 per FIG. 1B) is decrypted first and then encrypted to ensure functional correctness with storage encryption. Similarly for a disk write operation (e.g., to NVMe drive 102 per FIG. 1A), data is read from memory (160), decrypted, and re-encrypted before storing on the disk. Another embodiment introduces an ISA extension to allow software to program this mode to the CCE 129.

One or more embodiments reduce the overall power budget for the platform by decreasing the number of cryptographic engines present on the platform. This can translate to reduced operating costs in the cloud environments and increased battery life in mobile client environments. While the cryptographic work required with the CCE may be the same as multiple discrete engines, having multiple crypto IPs comes with additional wrapper/related logic which in a lot of cases is the primary source or area/power overheads for the IP.

Converged Crypto Engine (CCE)

In an embodiment, CCE enables cloud software to cryptographically isolate customer/user workloads (e.g., virtual machines (VMs)) in memory by encrypting each VMs memory with a separate key. CCE provides the capability to assign keys on a per-page basis. The key to be used for encrypting/decrypting a particular memory access is obtained from the physical address where the most significant bits represent a key identifier (KeyID). The keyID is used to lookup the key to use for the CCE engine to encrypt/decrypt a memory access. The key associated with the KeyID may be programmed by the VMM.

Figure 2:
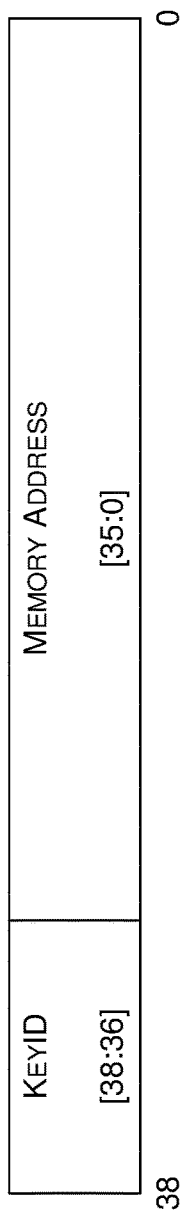
FIG. 2 illustrates a physical address layout, according to an embodiment.

FIG. 2 illustrates a physical address layout, according to an embodiment. FIG. 2 shows an example address layout where the physical address has 39 bits and the upper three bits [38-36] are used as KeyID. The most significant bits are used to identify the key used to protect the data. Different implementations can have more or less physical address bits and KeyID bits depending on the number of keys. As an example, an embodiment may support 64, 128, and so on keys for CCE. So, if the total number of keys is 64, 6 bits can be used in the PA (Physical Address) for key index and similarly for 128 keys, 7 bits can be used in the PA for key index.

Total Storage Encryption (TSE) for NVMe Encryption

Some implementations of TSE may use a crypto engine placed in the IO controller (IOC) for encrypting/decrypting data moving to/from the NVMe drive. The physical address originating from the drive is under the control of driver running on a host and is used to carry the information on location of blocks to be written/read to/from the drive using Logical block addressing (LBA) and a key lookup table index (KLT index). On receiving an address, the KLT index is used to index into a KLT, which contains an index into the Key table to determine the key and other metadata fields which are used to determine the LBA of the transfer.

Figure 3:
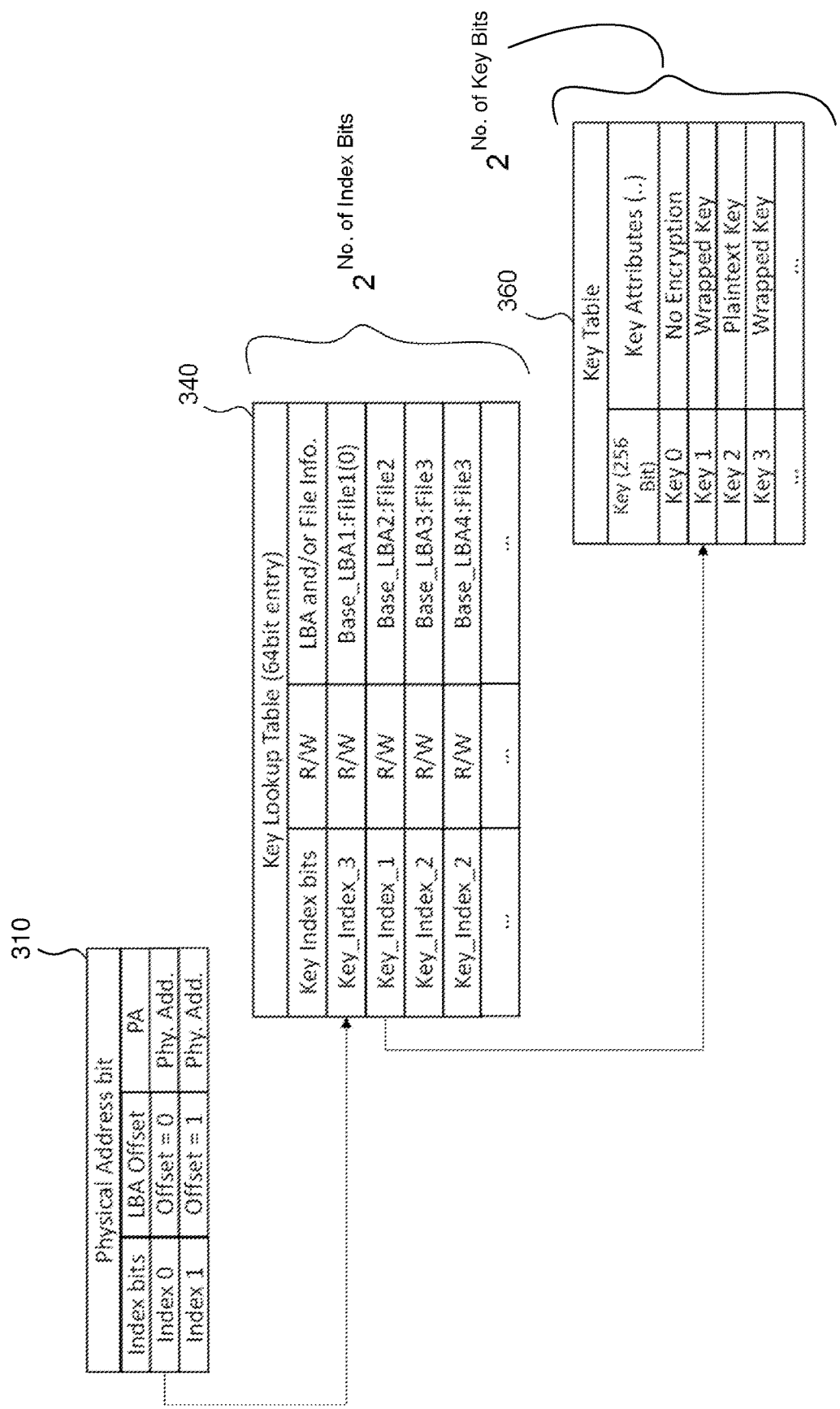
FIG. 3 shows the physical address breakdown and indexing into the various tables, according to an embodiment.

FIG. 3 shows the physical address breakdown and indexing into the various tables, according to an embodiment. The key in the key table is used by CCE 129 of FIGS. 1A and 1B to decrypt or encrypt data. In an embodiment, CCE may receive its keys from the CPU ISA 142 and/or or from a security controller 143 within the CPU ISA.

Moreover, the physical address received from the NVMe drive 102 may be carried in PCIe Transaction Layer packets and can be a guest physical address which can further be translated to receive the host physical address which is the actual physical address used to access memory 160.

Referring to FIG. 3, Table 310 illustrates an exemplary Physical Address Bits table with fields that identify the Index bits, LBA Offset, and Physical Address (PA). Using the appropriate key index, the CCE may then access the KLT which may have a 34-bit entry. The Key Lookup Table 340 comprises the following exemplary fields: Key Index bits, Read/Write (R/W) and LBA and/or File Info. The R/W field defines whether information is read or written. The LBA and/or File info field provides the material to generate the tweak for storage encryption (e.g., for AES-XTS). The LBA offset is taken from 310.

Finally, using the information from Table 340, information from Key Table 360 can be invoked. Key Table 360 has two fields: Key (256 bit) and Key Attribute field which identifies the encryption attribute or type which is used by CCE. It should be noted that the tables shown in FIG. 3 are illustrative and additional tables and/or fields may be added without departing from the disclosed principles.

The following illustrates an implementation according to one embodiment of the disclosure. In reference with FIGS. 1A, 1B, and 3, when a request from the NVMe drive (302, FIGS. 1A, 1B) is issued, CCE 129 (FIGS. 1A, 1B) extracts the index from the address bits (Table 310, FIG. 3). The CCE 129 also obtains the LBA and the Key ID from Key Lookup Table (340, FIG. 3) and then looks up the Key Id Table for the Keys and the Key attributes (Table 360).

CCE 129 adds the LBA offset to the Base LBA. The final LBA is the sum of the two values. This information provides CCE 129 with all the inputs for encrypting/decrypting the data (e.g., according to AES-XTS-256) in the PCIe TLP packets sent by (or being sent to) the NVMe driver 102. Based on this information, CCE 129 encrypts the data packets on the way to the NVMe drive 102 and decrypts the data packets on the way to the memory 160.

In some embodiments, depending on the attributes in the Key Table (Table 360, FIG. 3), CCE may optionally decide not to encrypt or decrypt a packet. For example, Software 140 may mark some packets as non-encrypt (e.g., by pointing to a no-encrypt key entry) to make sure that the NVMe drive 102 has the access to the command packets since the NVMe drive 102 has to process the packet.

The R/W bit shown at Key Lookup Table 340 (FIG. 3) increases the security of the system by making sure that the records are marked as 'R' can only be used for decryption while the records marked as 'W' are only used for encryption. In one embodiment, the R/W indications correspond to Read and Write to the NVME drive 102. This is the reverse of the Read and Write to the Memory 160.

The above embodiments generally describe single encryption with PCIe-based cryptography. These embodiments are applicable to, for example, data at rest. However, there are government and Cloud Service Provider (CSP) scenarios in which double encryption may be desired. For example, a Virtual Memory (VM) owner may like to protect its data such that the CSP cannot access it while the CSP may wish to restrict the VM owner from moving this data to another CSP. Double encryption also protects the data from the compromise of one of the keys in a CSP scenario or an incorrect implementation of the encryption. This enables VM owner to provide a key while the infrastructure may provide a separate key.

In an alternative embodiment, there may be two keys: the first key is at the service level that is provisioned to the VM owner and the second key may be provisioned to the infrastructure provider or CSP. The dual encryption may run at line speeds (e.g., PCIe Gen 5) while enabling two or more (N) keys. For simplicity, the following descriptions are provided with for a dual-key implementation. The dual-key implementation may comprise an infrastructure-key and a service-key. The infrastructure-key may be is owned by the infrastructure provider while the service-Key may be owned by the container or the VM-owner. The service owner may be prevented from controlling the infrastructure on which its service will. Conversely, the infrastructure owner may be prevented from controlling or determining which of all services they will run.

The system implementation described in relation to the inline encryption mechanism described above may be similarly applicable to multiple encryption keys with disparate owners. That is, in the case of a single inline encryption, the encryption engine receives all the key material and the tweak material from the key table and the key lookup table (KLT). This concept may be extended to provision a second key index in the key table itself.

According to this embodiment, the CCE can be extended to look for two key indexes in the table, read the keys from the key table and then do two AES key expansions to generate two set of round keys, two set of tweaks and then do 28 rounds of encryption, 14 rounds per key. The LBA for both the tweaks may be the same. However, changing the tweak key may change the tweaks and may result in two different tweaks. As before, the input data may be the data in the PCIe transaction layer packet (TLP) or from memory and the output will be encrypted or decrypted ciphertext/plaintext depending on whether it is a write or read transaction. The CCE (129, FIG. 1A, 1B) can process all the keys at line speeds in an inline fashion without ever releasing the keys to system software (140, FIG. 1A, 1B). In one embodiment, software (140, FIG. 1A, 1B) may choose which keys should be used by the encryption/decryption engine (CCE) and in which order by appropriately populating the key table.

In one embodiment, the data may be encrypted with the first key first and the ciphertext that is generated is then encrypted with the second key. The size of the plaintext, intermediate cipher text and the final ciphertext may be substantially the same since AES-XTS does not increase or decrease the size of the data. Finally, if the system software (e.g., Software 140, FIG. 1A, 1B) so chooses, it may decide to only decrypt using the second key by only putting the second key in the table (in the first key slot) and leaving the second key slot empty. This allows the software to unbind the data from infrastructure encryption while the service encryption stays. Software can now move this data to another infrastructure and encrypt it using the infrastructure-key of the second infrastructure.

Double-XCrypt Mode

An embodiment introduces a new mode for the CCE, the double Xcrypt mode or DX mode. In this mode, memory accesses to and from the MKTME engine which we now address as the CCE, does two rounds of cryptography.

Figure 4:
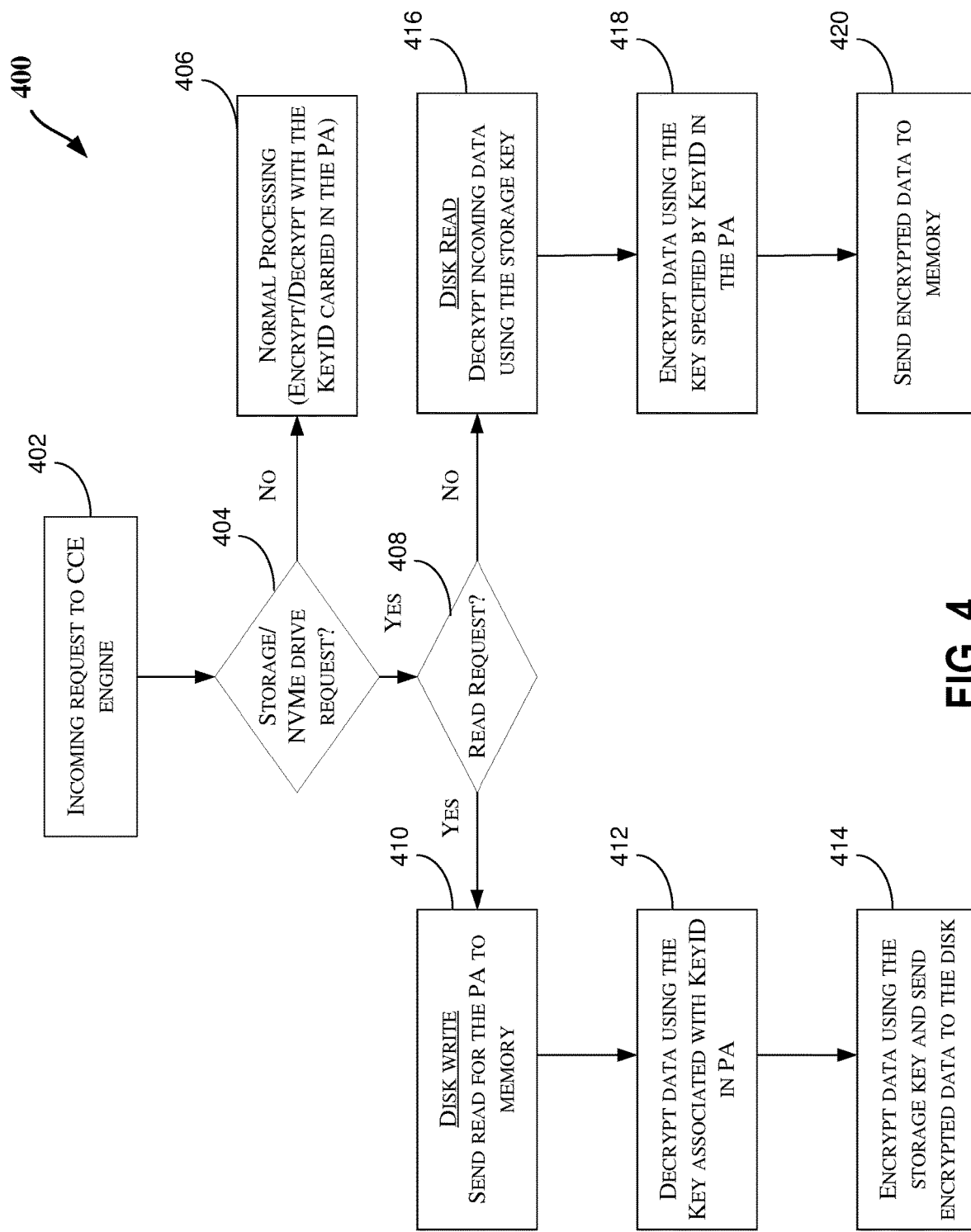
FIG. 4 illustrates a flow diagram of a method for request processing with a new mode, according to an embodiment.

More particularly, FIG. 4 illustrates a flow diagram of a method 400 for request processing with DX mode, according to an embodiment. On receiving a request 402, the CCE determines if the request is a storage/NVMe request 404. If not, the request is processed normally as done by the MKTME engine 406. More specifically, the KeyID received with the physical address of the request is used to lookup the key and encrypt/decrypt data as needed. If, on the other hand, the request is a storage request at 404, the CCE logic checks if it is a read request 408. If the request is a read request which essentially represents a write to the disk, the CCE issues a request to read the data from memory using the physical address and the associated KeyID 410. On receiving the response, the request is decrypted using the memory encryption key associated with the KeyID of the request 412. The decrypted data is then sent through another encryption round to encrypt the data with the storage key before storing it on the drive 414. The storage key is looked up using the logic described in FIG. 3.

If the request is a write request 408, which represents a read from the disk, the data received with the transaction is decrypted using the storage encryption key 416. The decrypted data is then re-encrypted with the memory encryption key using the KeyID carried in the physical address of the request 418. The encrypted data is then stored in memory 420.

In one embodiment, supporting TSE through a converged engine cannot collapse the encryption/decryption needed to one as the tweak used for encryption/decryption is different between storage (e.g., NVMe 102) and memory (e.g., memory 160). The storage encryption uses LBA as the tweak to ensure that all data stored on the device gets a spatially unique which ensures that same data stored at different locations in the disk encrypt differently. The system memory uses physical address as a tweak for its encryption to achieve spatial uniqueness. Storage cannot use physical address as the tweak as the same data from the drive can be written to different locations in memory at different points in time. Hence, it needs a physical address independent tweak for which reason the LBA is chosen as the tweak.

Additional Metadata on Memory Bus for Convergence

Figure 5:
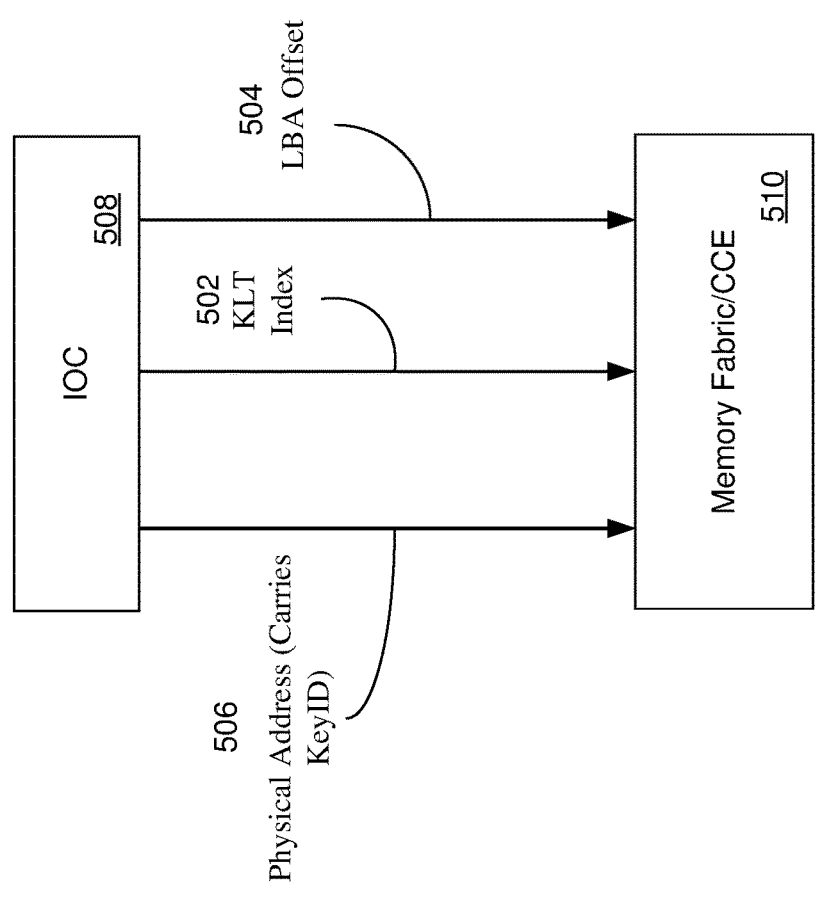
FIG. 5 illustrates new interface signals for CCE, according to an embodiment.

FIG. 5 illustrates new interface signals for CCE, according to an embodiment. As shown in FIG. 5, in order to support the convergence with CCE, an index to the Key Lookup Table (KLT) 502, LBA offset 504, and Physical Address 506 need to carried from IOC 508 over the memory fabric to the CCE 510 to allow CCE to lookup the right key and generate the correct tweak for encrypting/decrypting data from storage (e.g., NVMe 102).

ISA Support for TSE Convergence

In order to enable the converged crypto engine support for TSE, there are new instructions and MSRs (or extensions to existing instructions and MSRs, where MSR refers to a Model Specific Register or more generally a register) provided in some embodiments.

Enumeration and Activation

TSE capability is enumerated through a bit in extended features in CPUID (CPU Identifier). If CPUID enumerates TSE, there are two new MSRs supported, IA32_TSE_CAPABILITY and IA32_TSE_ACTIVATE. The capability of the CCE is enumerated using IA32_TSE_CAPABILITY MSR and the BIOS (Basic Input Output System) uses IA32_TSE_ACTIVATE MSRs to activate the CCE capability for storage encryption. Table 1 and 2 show these MSRs according to some embodiments.

TABLE 1

IA32_TME_CAPABILITY MSR

| Architectural MSR Name and bit fields (Former MSR Name) IA32_TSE_CAPABILITY MSR | MSR/Bit Description | Comment |
| --- | --- | --- |
| 0 | AES-XTS 256 bit encryption for storage with Double Xcrypt | |
| 1 | AES-XTS 256 bit encryption for storage | |
| 15:2 | Reserved | For future algorithms |
| 31:16 | TSE Keys | Enumerates the number of keys supported for storage encryption |
| 63:32 | RSVD | |

There are two new bits introduced to indicate support for storage encryption with CCE. Bit 1 indicates support for XTS-256b key encryption with double Xcrypt mode and bit 2 indicates support for XTS-256b encryption without double Xcrypt. Software will use bit 0 with the key for storage when MKTME is enabled for memory to enable double Xcrypt of data moving to and from storage. Software uses bit 1 when MKTME is not enabled and only disk is encrypted. Bits 31:16 enumerate the number of total keys that are supported for storage encryption. Systems can support different number of storage and/or memory encryption keys depending on the implementation.

TABLE 2

IA32_TME_CAPABILITY MSR

| Architectural MSR Name and bit fields (Former MSR Name) IA32_TSE_ACTIVATE MSR | MSR/Bit Description | Comment |
| --- | --- | --- |
| 0 | Lock RO | |
| 1 | Enable | |
| 15:8 | RSVD | Reserved |
| 31:16 | TSE Keys | Number of keys enabled for TSE |
| 39:32 | TSE_ALG_ENABLE | This field is used to enable algorithms for TSE |
| 63:40 | RSVD | |

TSE_ACTIVATE MSR is used by the BIOS to activate CCE capabilities. Bits 31:16 are a 16-bit field to indicate how many keys are activated for storage encryption. Bits 39:32 are an 8-bit field which is used by the BIOS to enable algorithms. Some embodiments outline two algorithms in capability MSR (one with DX and one without it with 256b encryption). There can be other algorithms added as well.

Key Programming

An existing instruction for key programming, PCONFIG, is extended for TSE. There is a new leaf added to PCONFIG instruction, TSE_KEY_PROGRAM.

PCONFIG.CPUID_LEAF enumeration extended to enumerate TSE as a supported target

TSE enumeration (and implicit availability of TSE_KEY_PROGRAM leaf) is tied to TSE feature enumeration in TME_CAPABILITY MSR There can also be embodiments where the key for TSE is programmed through wrapped blobs as follows:

TSE_KEY_PROGRAM Leaf

PCONFIG executed with the following parameters:

EAX: 2 h.

RBX: Effective address of TSE_KEY_PROGRAM_STRUCT (defined in FIG. 6)

EAX is a register on the processor as an example, but embodiments are not limited to using EAX and other register(s) or memory may be used to pass the operands to the instruction. More particularly, FIG. 6 illustrates sample fields for key information, according to an embodiment. In one embodiment, software constructs the structure of FIG. 6 and populates Key Index, key control (command: set key, clear key, no encrypt ENC_ALG (Encryption Algorithm): AES-256b with DX, AES-256b without DX), and the keys to be associated with the key index (data and a tweak key). As discussed herein, MBZ stands for "must be zero".

The commands allow control over the key with set key setting the key, clear key removing the key from hardware for a particular Key index, and no encrypt mode setting the key in no encrypt mode.

In at least one embodiments, TSE will be assigned a target identifier (TID) as follows:

0: Invalid TID

1: MKTME

2: TSE

If TSE is supported on the platform (e.g., as indicated by CPUID), CPUID.PCONFIG_LEAF will enumerate TSE as a supported target and TSE_KEY_PROGRAM leaf is available when TSE is enumerated by PCONFIG as a target.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source 1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 7A is a block diagram illustrating an exemplary instruction format according to embodiments. FIG. 7A shows an instruction format 700 that is specific in the sense that it specifies the location, size, interpretation, and order of the fields, as well as values for some of those fields. The instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions.

EVEX Prefix (Bytes 0-3) 702—is encoded in a four-byte form.

Format Field 782 (EVEX Byte 0, bits [7:0])—the first byte (EVEX Byte 0) is the format field 782 and it contains 0x62 (the unique value used for distinguishing the vector friendly instruction format in one embodiment).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]-R), EVEX.X bit field (EVEX byte 1, bit [6]-X), and 757BEX byte 1, bit [5]-B). The EVEX.R, EVEX.X, and EVEX.B bit fields provide the same functionality as the corresponding VEX bit fields, and are encoded using 1s complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field QAc10—this is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]-mmmm)-its content encodes an implied leading opcode byte (OF, OF 38, or OF 3).

Data element width field 764 (EVEX byte 2, bit [7]-W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX.vvvv 720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1 s complement) form. Depending on the instruction, an extra different EVEX bit field is used to extend the specifier size to 32 registers.

EVEX.U 768 Class field (EVEX byte 2, bit [2]-U)—If EVEX.U=0, it indicates class A (support merging-writemasking) or EVEX.U0; if EVEX.U=1, it indicates class B (support zeroing and merging-writemasking) or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 753 (EVEX byte 3, bit [7]-EH; also known as EVEX.EH, EVEX.rs, EVEX.RL, EVEX.writemask control, and EVEX.N; also illustrated with α)—its content distinguishes which one of the different augmentation operation types are to be performed.

Beta field 755 (EVEX byte 3, bits [6:4]-SSS, also known as EVEX.s2-0, EVEX.r2-0, EVEX.rr1, EVEX.LL0, EVEX.LLB; also illustrated with βββ)—distinguishes which of the operations of a specified type are to be performed.

REX' field 710—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Writemask field 771 (EVEX byte 3, bits [2:0]-kkk)—its content specifies the index of a register in the writemask registers. In one embodiment, the specific value EVEX.kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 771 allows for partial vector operations, including loads, stores, arithmetic, logical, etc. While embodiments are described in which the writemask field's 771 content selects one of a number of writemask registers that contains the writemask to be used (and thus the writemask field's 771 content indirectly identifies that masking to be performed), alternative embodiments instead or additional allow the mask write field's 771 content to directly specify the masking to be performed.

Real Opcode Field 730 (Byte 4) is also known as the opcode byte. Part of the opcode is specified in this field.

MOD R/M Field 740 (Byte 5) includes MOD field 742, register index field 744, and R/M field 746. The MOD field's 742 content distinguishes between memory access and non-memory access operations. The role of register index field 744 can be summarized to two situations: encoding either the destination register operand or a source register operand, or be treated as an opcode extension and not used to encode any instruction operand. The content of register index field 744, directly or through address generation, specifies the locations of the source and destination operands, be they in registers or in memory. These include a sufficient number of bits to select N registers from a PxQ (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

The role of R/M field 746 may include the following: encoding the instruction operand that references a memory address, or encoding either the destination register operand or a source register operand.

Scale, Index, Base (SIB) Byte 750 (Byte 6)—The scale field's 752 content allows for the scaling of the index field's content for memory address generation (e.g., for address generation that uses 2scale*index+base). SIB.xxx 754 and SIB.bbb 756—the contents of these fields have been previously referred to with regard to the register indexes Xxxx and Bbbb.

Displacement field 763A (Bytes 7-10)—when MOD field 742 contains 10, bytes 7-10 are the displacement field 763A, and it works the same as the legacy 32-bit displacement (disp32) and works at byte granularity. This may be used as part of memory address generation (e.g., for address generation that uses 2scale*index+base +displacement).

Displacement factor field 763B (Byte 7)—when MOD field 742 contains 01, byte 7 is the displacement factor field 763B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 763B is a reinterpretation of disp8; when using displacement factor field 763B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 763B substitutes the legacy x86 instruction set 8-bit displacement. Thus, the displacement factor field 763B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 772 allows for the specification of an immediate. This field is optional in the sense that is it not present in an implementation of the generic vector friendly format that does not support immediate and it is not present in instructions that do not use an immediate.

Full Opcode Field

FIG. 7B is a block diagram illustrating the fields of the instruction format 700 that make up the full opcode field 774 according to one embodiment. Specifically, the full opcode field 774 includes the format field 782, the base operation field 743, and the data element width (W) field 763. The base operation field 743 includes the prefix encoding field 725, the opcode map field 715, and the real opcode field 730.

Register Index Field

FIG. 7C is a block diagram illustrating the fields of the format 700 that make up the register index field 745 according to one embodiment. Specifically, the register index field 745 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
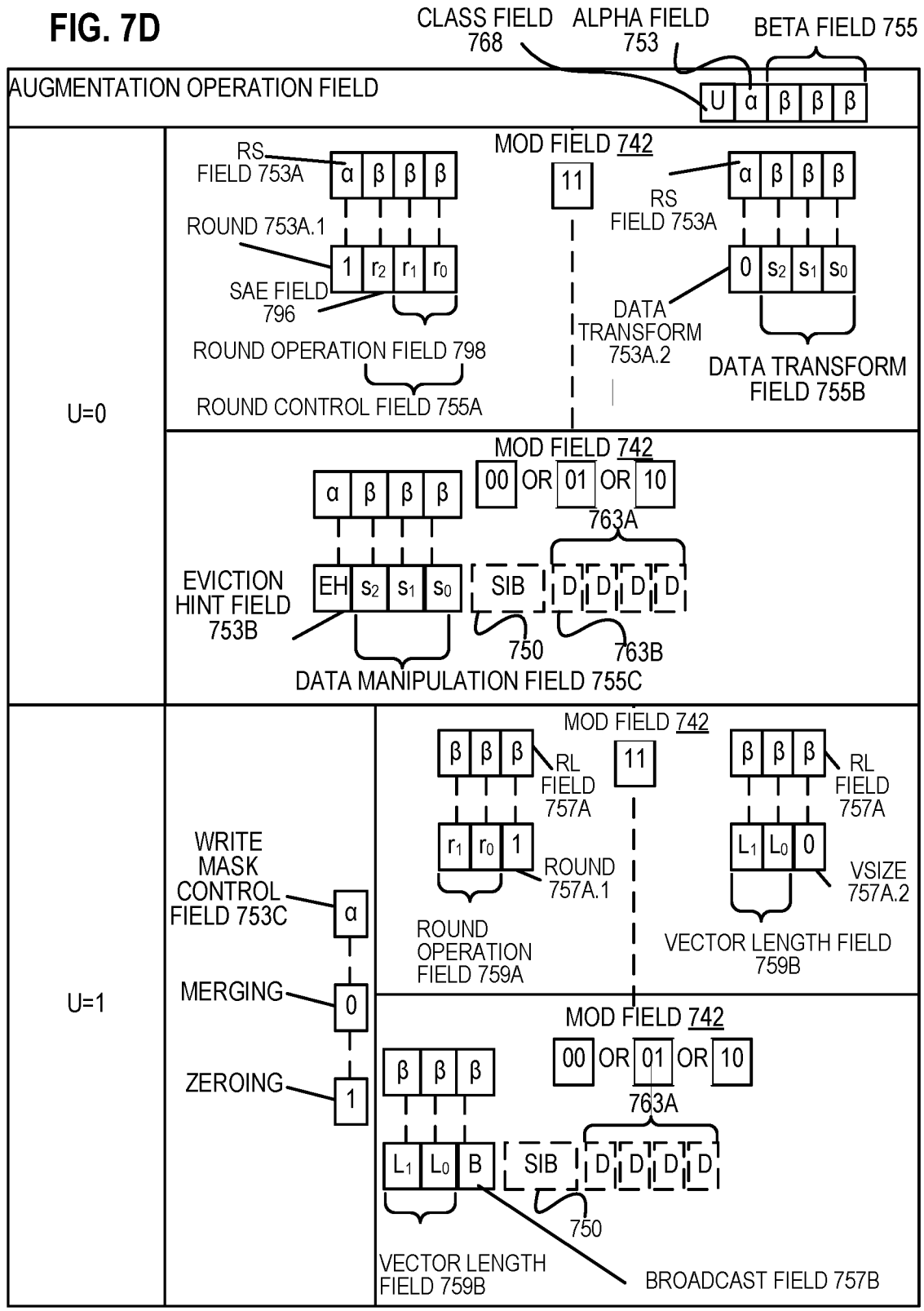
FIG. 7D is a block diagram illustrating the fields of the instruction format that make up the augmentation operation field according to one embodiment.

FIG. 7D is a block diagram illustrating the fields of the instruction format 700 that make up an augmentation operation field according to one embodiment. When the class (U) field 768 contains 0, it signifies EVEX.U0 (class A 768A); when it contains 1, it signifies EVEX.U1 (class B 768B). When U=0 and the MOD field 742 contains 11 (signifying a no memory access operation), the alpha field 753 (EVEX byte 3, bit [7]-EH) is interpreted as the rs field 753A. When the rs field 753A contains a 1 (round 753A.1), the beta field 755 (EVEX byte 3, bits [6:4]-SSS) is interpreted as the round control field 755A. The round control field 755A includes a one bit SAE field 796 and a two bit round operation field 798. When the rs field 753A contains a 0 (data transform 753A.2), the beta field 755 (EVEX byte 3, bits [6:4]-SSS) is interpreted as a three bit data transform field 755B. When U=0 and the MOD field 742 contains 00, 01, or 10 (signifying a memory access operation), the alpha field 753 (EVEX byte 3, bit [7]-EH) is interpreted as the eviction hint (EH) field 753B and the beta field 755 (EVEX byte 3, bits [6:4]-SSS) is interpreted as a three bit data manipulation field 755C.

When U=1, the alpha field 753 (EVEX byte 3, bit [7]-EH) is interpreted as the writemask control (Z) field 753C. When U=1 and the MOD field 742 contains 11 (signifying a no memory access operation), part of the beta field 755 (EVEX byte 3, bit [4]-S0) is interpreted as the RL field 757A; when it contains a 1 (round 757A.1) the rest of the beta field 755 (EVEX byte 3, bit [6-5]-S2-1) is interpreted as the round operation field 759A, while when the RL field 757A contains a 0 (VSIZE 757.A2) the rest of the beta field 755 (EVEX byte 3, bit [6-5]-S2-1) is interpreted as the vector length field 759B (EVEX byte 3, bit [6-5]-L1-0). When U=1 and the MOD field 742 contains 00, 01, or 10 (signifying a memory access operation), the beta field 755 (EVEX byte 3, bits [6:4]-SSS) is interpreted as the vector length field 759B (EVEX byte 3, bit [6-5]-L1-0) and the broadcast field 757B (EVEX byte 3, bit [4]-B).

Exemplary Register Architecture

Figure 8:
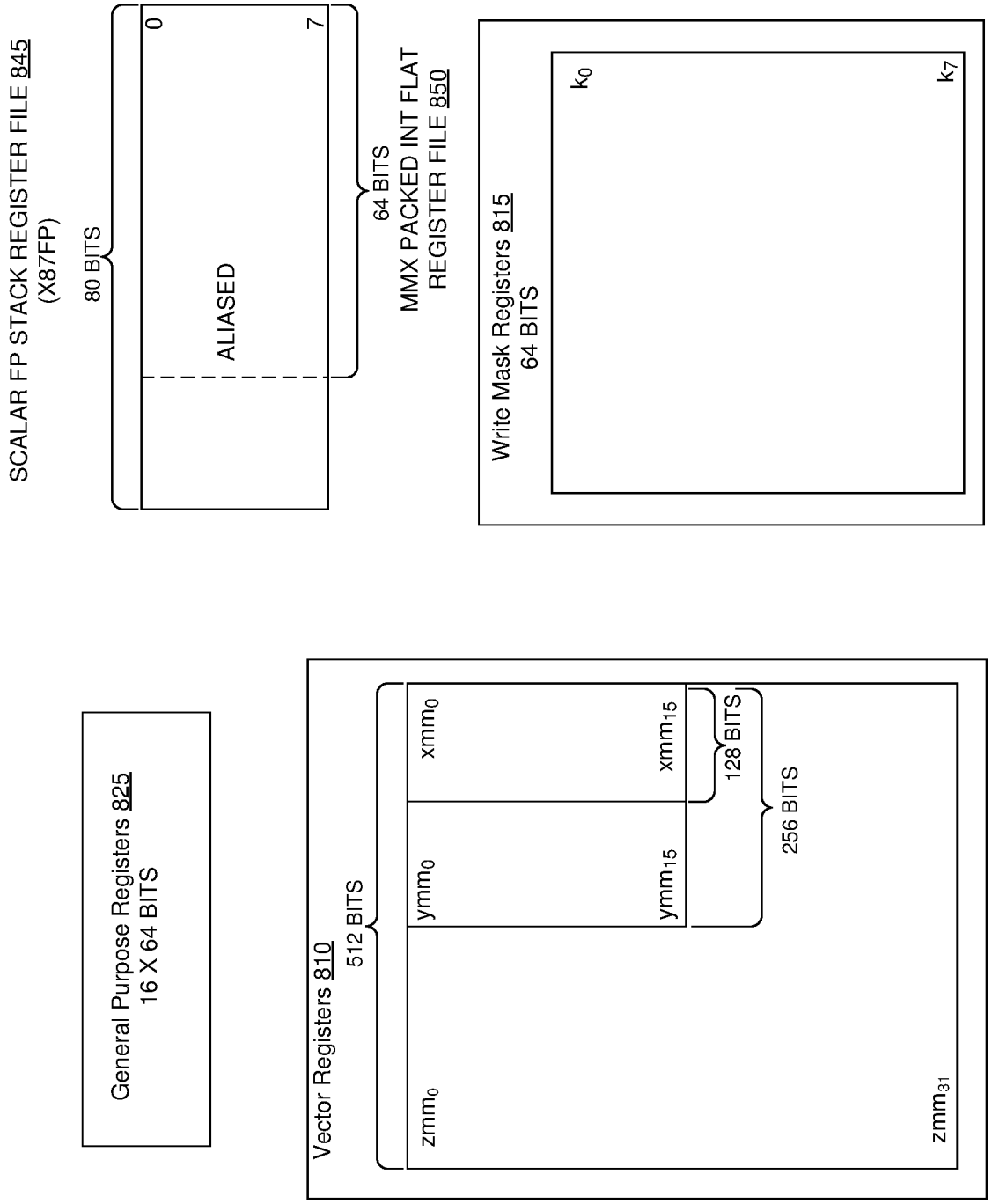
FIG. 8 is a block diagram of a register architecture according to one embodiment.

FIG. 8 is a block diagram of a register architecture 800 according to one embodiment. In the embodiment illustrated, there are 32 vector registers 810 that are 512 bits wide; these registers are referenced as ZMM0 through ZMM31. The lower order 256 bits of the lower 16 ZMM registers are overlaid on registers YMM0-16. The lower order 128 bits of the lower 16 ZMM registers (the lower order 128 bits of the YMM registers) are overlaid on registers XMM0-15. In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the instruction format 700 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 815—in the embodiment illustrated, there are 8 writemask registers (k0 through k7), each 64 bits in size. In an alternate embodiment, the writemask registers 815 are 16 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

Figure 9:
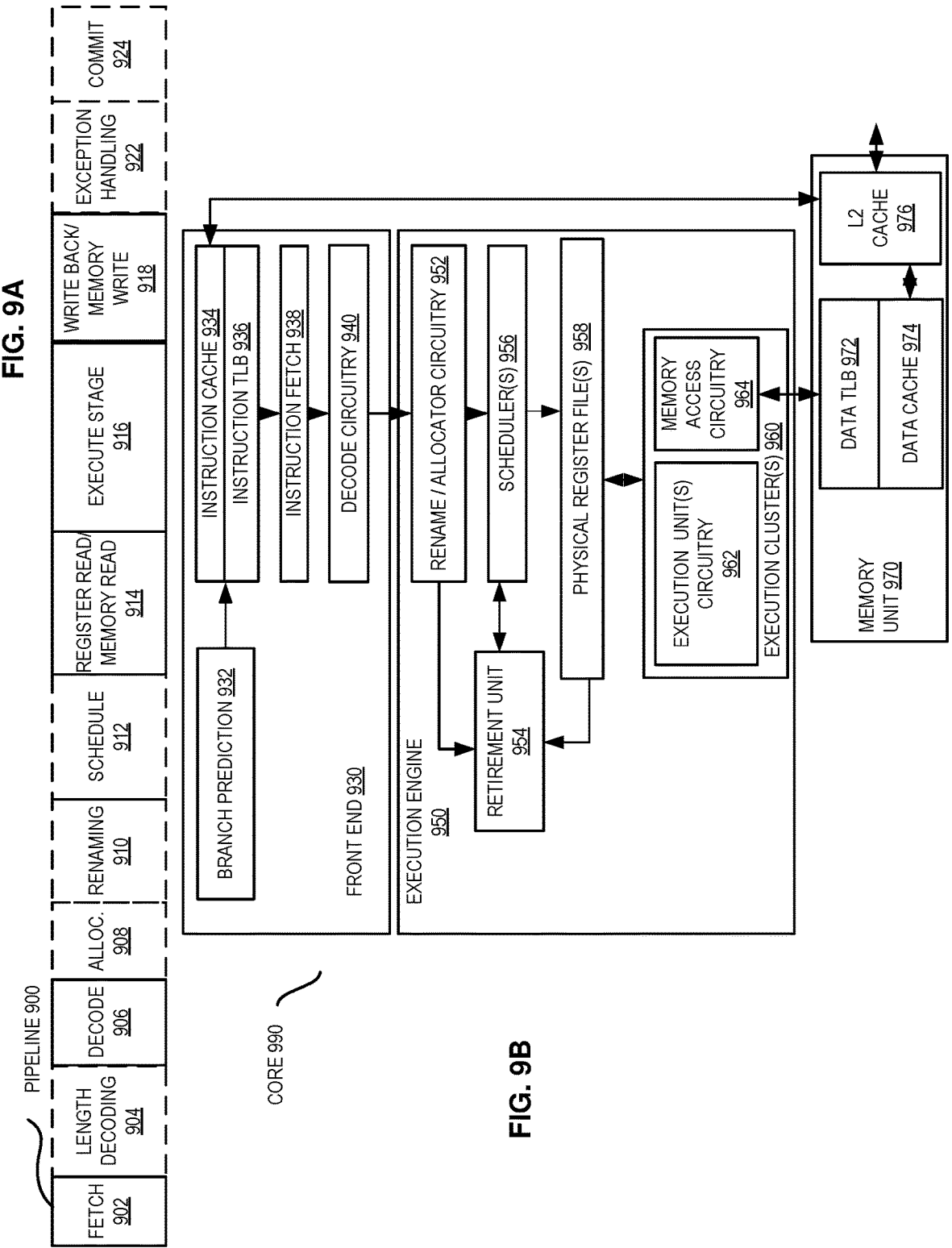
FIG. 9A is a block diagram illustrating both an exemplary in-order pipeline and an exemplary register renaming, out-of-order issue/execution pipeline according to embodiments.
FIG. 9B is a block diagram illustrating both an exemplary embodiment of an in-order architecture core and an exemplary register renaming, out-of-order issue/execution architecture core to be included in a processor according to embodiments.

FIG. 9A is a block diagram illustrating both an exemplary in-order pipeline and an exemplary register renaming, out-of-order issue/execution pipeline according to embodiments. FIG. 9B is a block diagram illustrating both an exemplary embodiment of an in-order architecture core and an exemplary register renaming, out-of-order issue/execution architecture core to be included in a processor according to embodiments. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a writemask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the ×86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

Figure 10:
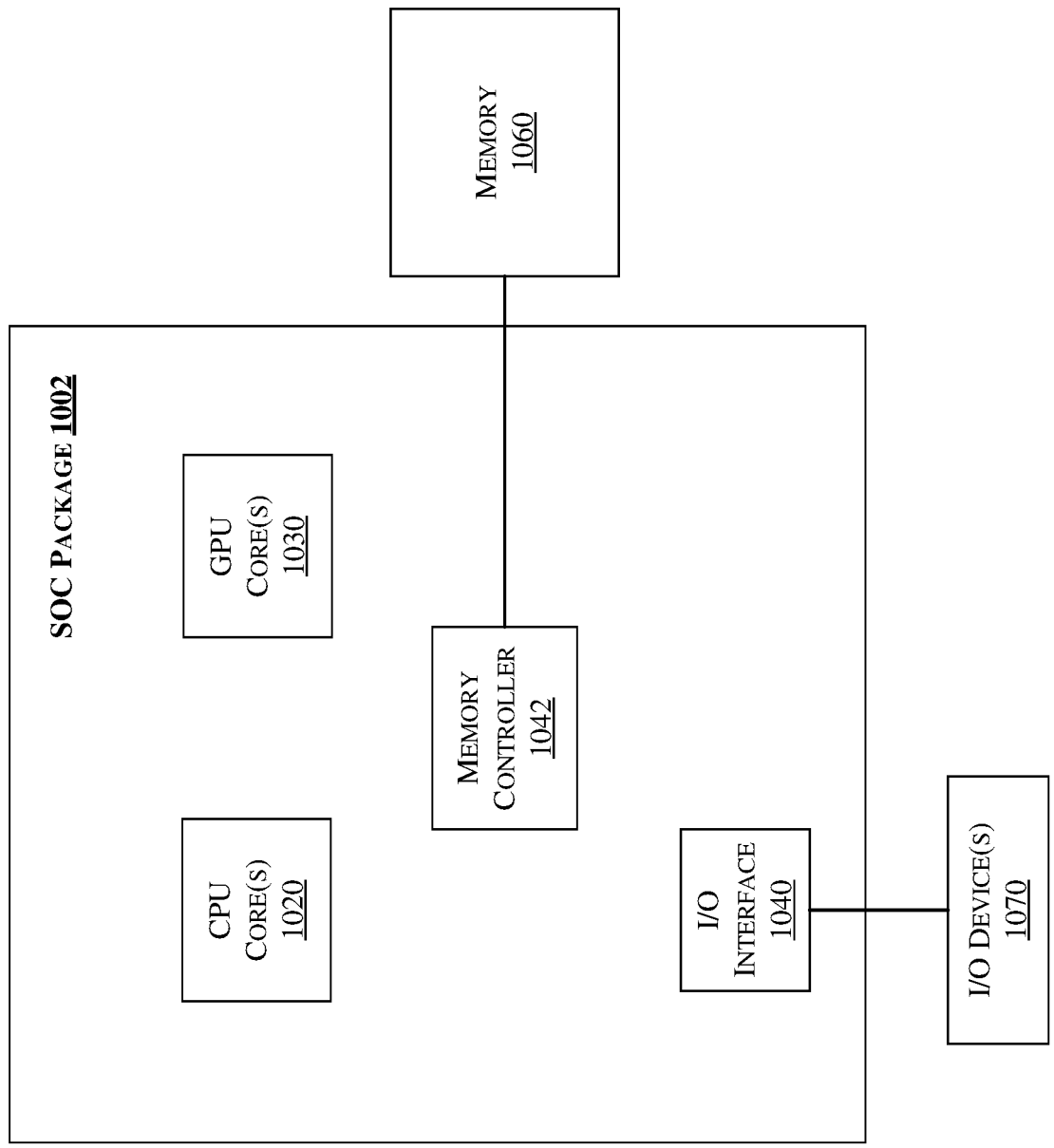
FIG. 10 illustrates a block diagram of an SOC (System On Chip) package in accordance with an embodiment.

FIG. 10 illustrates a block diagram of an SOC package in accordance with an embodiment. As illustrated in FIG. 10, SOC 1002 includes one or more Central Processing Unit (CPU) cores 1020, one or more Graphics Processor Unit (GPU) cores 1030, an Input/Output (I/O) interface 1040, and a memory controller 1042. Various components of the SOC package 1002 may be coupled to an interconnect or bus such as discussed herein with reference to the other figures. Also, the SOC package 1002 may include more or less components, such as those discussed herein with reference to the other figures. Further, each component of the SOC package 1002 may include one or more other components, e.g., as discussed with reference to the other figures herein. In one embodiment, SOC package 1002 (and its components) is provided on one or more Integrated Circuit (IC) die, e.g., which are packaged into a single semiconductor device.

As illustrated in FIG. 10, SOC package 1002 is coupled to a memory 1060 via the memory controller 1042. In an embodiment, the memory 1060 (or a portion of it) can be integrated on the SOC package 1002.

The I/O interface 1040 may be coupled to one or more I/O devices 1070, e.g., via an interconnect and/or bus such as discussed herein with reference to other figures. I/O device(s) 1070 may include one or more of a keyboard, a mouse, a touchpad, a display, an image/video capture device (such as a camera or camcorder/video recorder), a touch screen, a speaker, or the like.

Figure 11:
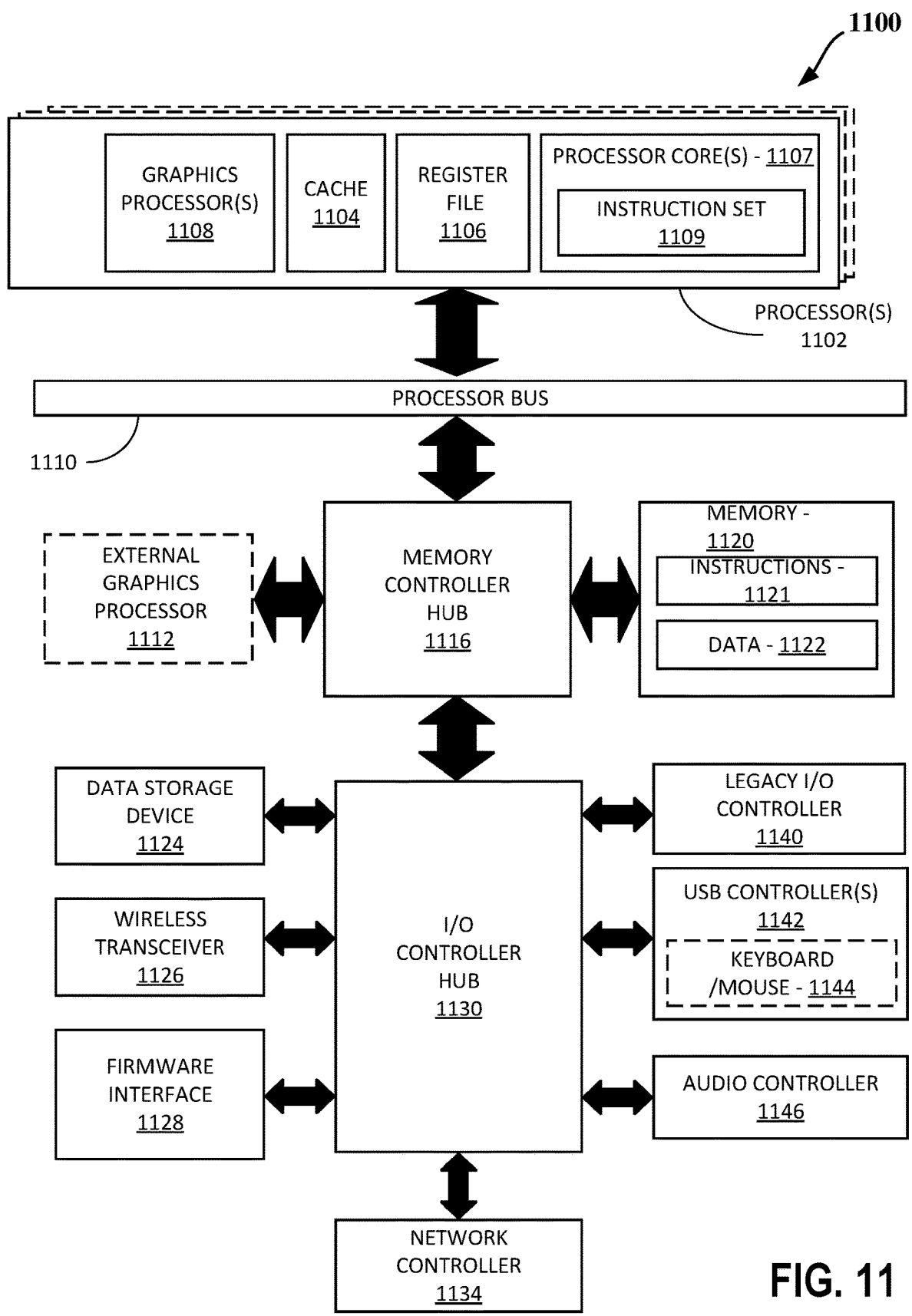
FIG. 11 is a block diagram of a processing system, according to an embodiment.

FIG. 11 is a block diagram of a processing system 1100, according to an embodiment. In various embodiments the system 1100 includes one or more processors 1102 and one or more graphics processors 1108, and may be a single processor desktop system, a multiprocessor workstation system, or a server system having a large number of processors 1102 or processor cores 1107. In on embodiment, the system 1100 is a processing platform incorporated within a system-on-a-chip (SoC or SOC) integrated circuit for use in mobile, handheld, or embedded devices.

An embodiment of system 1100 can include, or be incorporated within a server-based gaming platform, a game console, including a game and media console, a mobile gaming console, a handheld game console, or an online game console. In some embodiments system 1100 is a mobile phone, smart phone, tablet computing device or mobile Internet device. Data processing system 1100 can also include, couple with, or be integrated within a wearable device, such as a smart watch wearable device, smart eyewear device, augmented reality device, or virtual reality device. In some embodiments, data processing system 1100 is a television or set top box device having one or more processors 1102 and a graphical interface generated by one or more graphics processors 1108.

In some embodiments, the one or more processors 1102 each include one or more processor cores 1107 to process instructions which, when executed, perform operations for system and user software. In some embodiments, each of the one or more processor cores 1107 is configured to process a specific instruction set 1109. In some embodiments, instruction set 1109 may facilitate Complex Instruction Set Computing (CISC), Reduced Instruction Set Computing (RISC), or computing via a Very Long Instruction Word (VLIW). Multiple processor cores 1107 may each process a different instruction set 1109, which may include instructions to facilitate the emulation of other instruction sets. Processor core 1107 may also include other processing devices, such a Digital Signal Processor (DSP).

In some embodiments, the processor 1102 includes cache memory 1104. Depending on the architecture, the processor 1102 can have a single internal cache or multiple levels of internal cache. In some embodiments, the cache memory is shared among various components of the processor 1102. In some embodiments, the processor 1102 also uses an external cache (e.g., a Level-3 (L3) cache or Last Level Cache (LLC)) (not shown), which may be shared among processor cores 1107 using known cache coherency techniques. A register file 1106 is additionally included in processor 1102 which may include different types of registers for storing different types of data (e.g., integer registers, floating point registers, status registers, and an instruction pointer register). Some registers may be general-purpose registers, while other registers may be specific to the design of the processor 1102.

In some embodiments, processor 1102 is coupled to a processor bus 1110 to transmit communication signals such as address, data, or control signals between processor 1102 and other components in system 1100. In one embodiment the system 1100 uses an exemplary 'hub' system architecture, including a memory controller hub 1116 and an Input Output (I/O) controller hub 1130. A memory controller hub 1116 facilitates communication between a memory device and other components of system 1100, while an I/O Controller Hub (ICH) 1130 provides connections to I/O devices via a local I/O bus. In one embodiment, the logic of the memory controller hub 1116 is integrated within the processor.

Memory device 1120 can be a dynamic random access memory (DRAM) device, a static random access memory (SRAM) device, flash memory device, phase-change memory device, or some other memory device having suitable performance to serve as process memory. In one embodiment the memory device 1120 can operate as system memory for the system 1100, to store data 1122 and instructions 1121 for use when the one or more processors 1102 executes an application or process. Memory controller hub 1116 also couples with an optional external graphics processor 1112, which may communicate with the one or more graphics processors 1108 in processors 1102 to perform graphics and media operations.

In some embodiments, ICH 1130 enables peripherals to connect to memory device 1120 and processor 1102 via a high-speed I/O bus. The I/O peripherals include, but are not limited to, an audio controller 1146, a firmware interface 1128, a wireless transceiver 1126 (e.g., Wi-Fi, Bluetooth), a data storage device 1124 (e.g., hard disk drive, flash memory, etc.), and a legacy I/O controller 1140 for coupling legacy (e.g., Personal System 2 (PS/2)) devices to the system. One or more Universal Serial Bus (USB) controllers 1142 connect input devices, such as keyboard and mouse 1144 combinations. A network controller 1134 may also couple to ICH 1130. In some embodiments, a high-performance network controller (not shown) couples to processor bus 1110. It will be appreciated that the system 1100 shown is exemplary and not limiting, as other types of data processing systems that are differently configured may also be used. For example, the I/O controller hub 1130 may be integrated within the one or more processor 1102, or the memory controller hub 1116 and I/O controller hub 1130 may be integrated into a discreet external graphics processor, such as the external graphics processor 1112.

Figure 12:
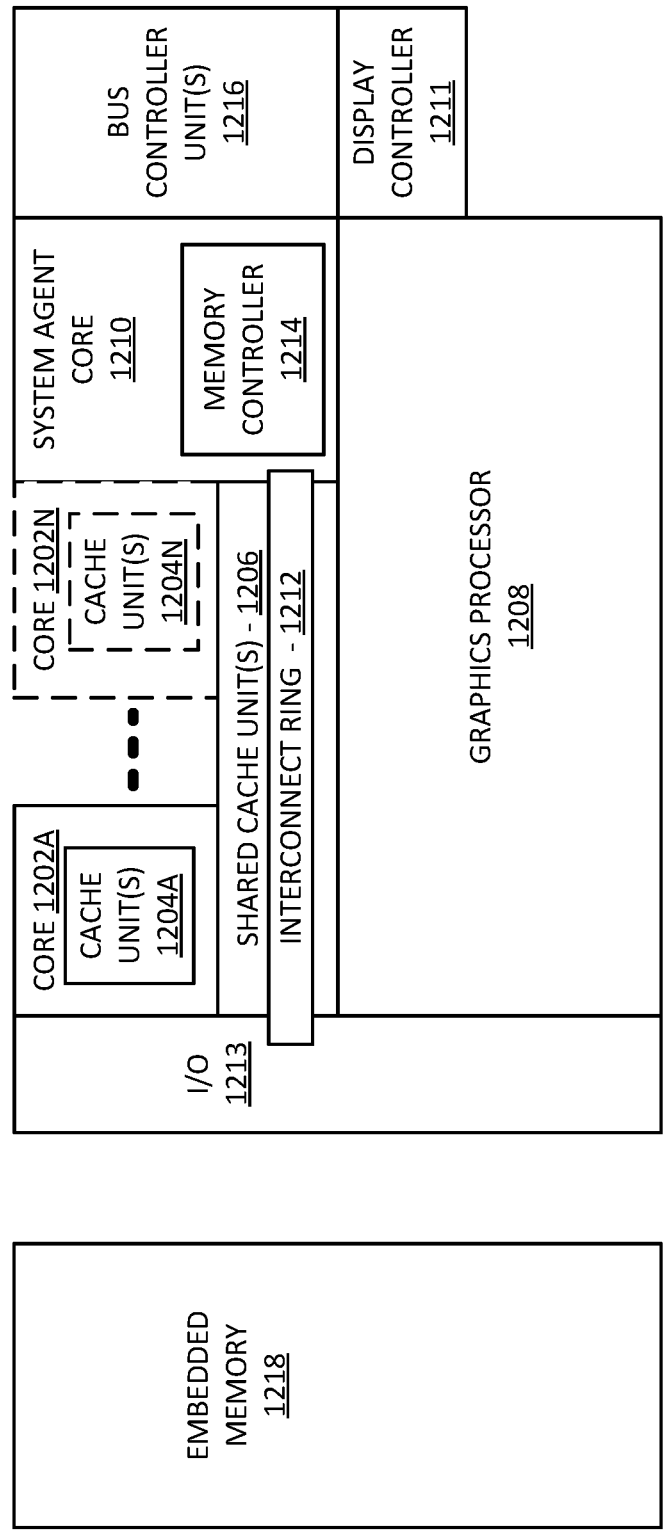
FIG. 12 is a block diagram of an embodiment of a processor having one or more processor cores, according to some embodiments.

FIG. 12 is a block diagram of an embodiment of a processor 1200 having one or more processor cores 1202A to 1202N, an integrated memory controller 1214, and an integrated graphics processor 1208. Those elements of FIG. 12 having the same reference numbers (or names) as the elements of any other figure herein can operate or function in any manner similar to that described elsewhere herein, but are not limited to such. Processor 1200 can include additional cores up to and including additional core 1202N represented by the dashed lined boxes. Each of processor cores 1202A to 1202N includes one or more internal cache units 1204A to 1204N. In some embodiments each processor core also has access to one or more shared cached units 1206.

The internal cache units 1204A to 1204N and shared cache units 1206 represent a cache memory hierarchy within the processor 1200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1206 and 1204A to 1204N.

In some embodiments, processor 1200 may also include a set of one or more bus controller units 1216 and a system agent core 1210. The one or more bus controller units 1216 manage a set of peripheral buses, such as one or more Peripheral Component Interconnect buses (e.g., PCI, PCI Express). System agent core 1210 provides management functionality for the various processor components. In some embodiments, system agent core 1210 includes one or more integrated memory controllers 1214 to manage access to various external memory devices (not shown).

In some embodiments, one or more of the processor cores 1202A to 1202N include support for simultaneous multi-threading. In such embodiment, the system agent core 1210 includes components for coordinating and operating cores 1202A to 1202N during multi-threaded processing. System agent core 1210 may additionally include a power control unit (PCU), which includes logic and components to regulate the power state of processor cores 1202A to 1202N and graphics processor 1208.

In some embodiments, processor 1200 additionally includes graphics processor 1208 to execute graphics processing operations. In some embodiments, the graphics processor 1208 couples with the set of shared cache units 1206, and the system agent core 1210, including the one or more integrated memory controllers 1214. In some embodiments, a display controller 1211 is coupled with the graphics processor 1208 to drive graphics processor output to one or more coupled displays. In some embodiments, display controller 1211 may be a separate module coupled with the graphics processor via at least one interconnect, or may be integrated within the graphics processor 1208 or system agent core 1210.

In some embodiments, a ring based interconnect unit 1212 is used to couple the internal components of the processor 1200. However, an alternative interconnect unit may be used, such as a point-to-point interconnect, a switched interconnect, or other techniques, including techniques well known in the art. In some embodiments, graphics processor 1208 couples with the ring interconnect 1212 via an I/O link 1213.

The exemplary I/O link 1213 represents at least one of multiple varieties of I/O interconnects, including an on package I/O interconnect which facilitates communication between various processor components and a high-performance embedded memory module 1218, such as an eDRAM (or embedded DRAM) module. In some embodiments, each of the processor cores 1202 to 1202N and graphics processor 1208 use embedded memory modules 1218 as a shared Last Level Cache.

In some embodiments, processor cores 1202A to 1202N are homogenous cores executing the same instruction set architecture. In another embodiment, processor cores 1202A to 1202N are heterogeneous in terms of instruction set architecture (ISA), where one or more of processor cores 1202A to 1202N execute a first instruction set, while at least one of the other cores executes a subset of the first instruction set or a different instruction set. In one embodiment processor cores 1202A to 1202N are heterogeneous in terms of microarchitecture, where one or more cores having a relatively higher power consumption couple with one or more power cores having a lower power consumption. Additionally, processor 1200 can be implemented on one or more chips or as an SoC integrated circuit having the illustrated components, in addition to other components.

Figure 13:
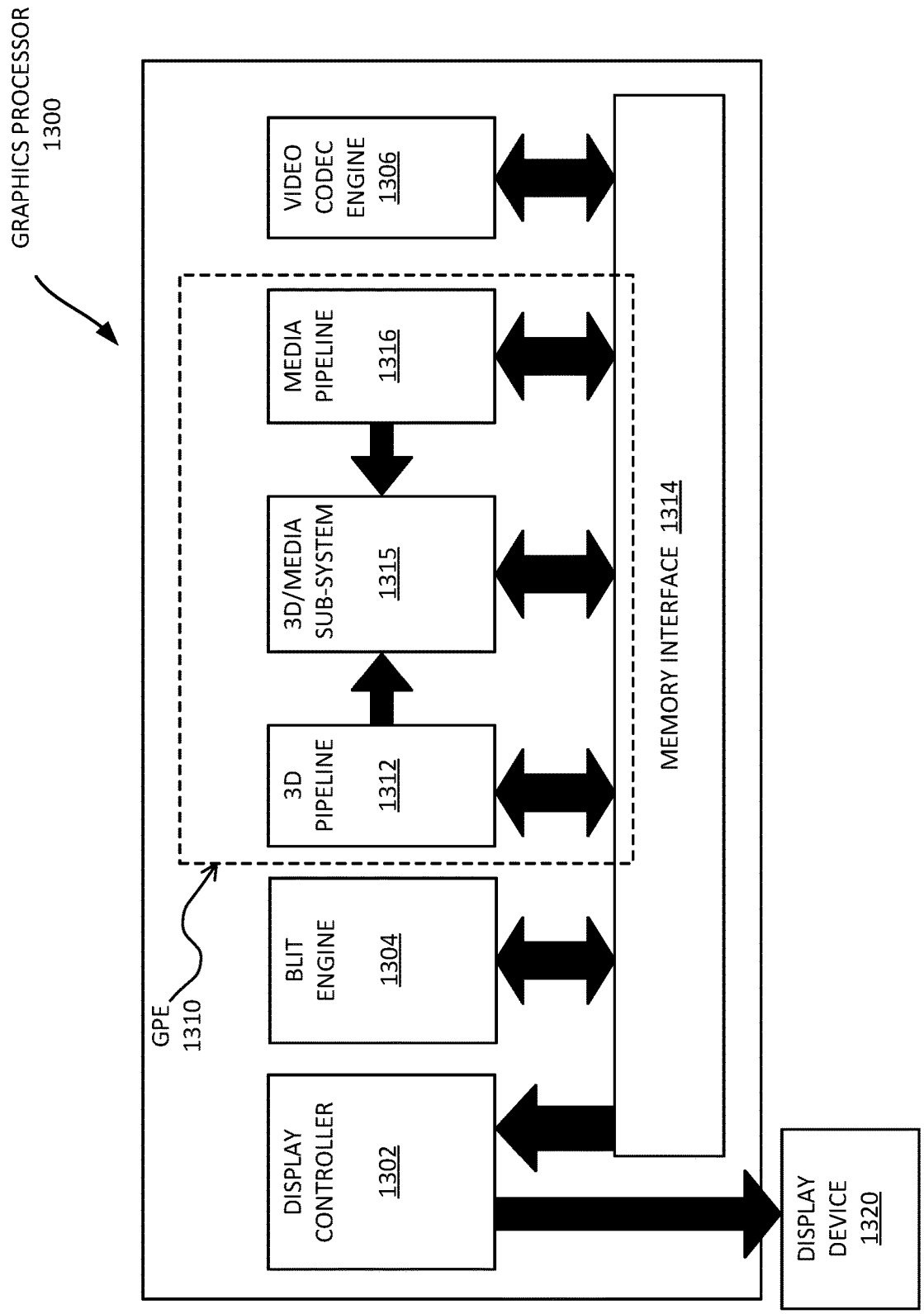
FIG. 13 is a block diagram of a graphics processor, according to an embodiment.

FIG. 13 is a block diagram of a graphics processor 1300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1300 includes a memory interface 1314 to access memory. Memory interface 1314 can be an interface to local memory, one or more internal caches, one or more shared external caches, and/or to system memory.

In some embodiments, graphics processor 1300 also includes a display controller 1302 to drive display output data to a display device 1320. Display controller 1302 includes hardware for one or more overlay planes for the display and composition of multiple layers of video or user interface elements. In some embodiments, graphics processor 1300 includes a video codec engine 1306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1300 includes a block image transfer (BLIT) engine 1304 to perform two-dimensional (2D) rasterizer operations including, for example, bit-boundary block transfers. However, in one embodiment, 3D graphics operations are performed using one or more components of graphics processing engine (GPE) 1310. In some embodiments, graphics processing engine 1310 is a compute engine for performing graphics operations, including three-dimensional (3D) graphics operations and media operations.

In some embodiments, GPE 1310 includes a 3D pipeline 1312 for performing 3D operations, such as rendering three-dimensional images and scenes using processing functions that act upon 3D primitive shapes (e.g., rectangle, triangle, etc.). The 3D pipeline 1312 includes programmable and fixed function elements that perform various tasks within the element and/or spawn execution threads to a 3D/Media sub-system 1315. While 3D pipeline 1312 can be used to perform media operations, an embodiment of GPE 1310 also includes a media pipeline 1316 that is specifically used to perform media operations, such as video post-processing and image enhancement.

In some embodiments, media pipeline 1316 includes fixed function or programmable logic units to perform one or more specialized media operations, such as video decode acceleration, video de-interlacing, and video encode acceleration in place of, or on behalf of video codec engine 1306. In some embodiments, media pipeline 1316 additionally includes a thread spawning unit to spawn threads for execution on 3D/Media sub-system 1315. The spawned threads perform computations for the media operations on one or more graphics execution units included in 3D/Media subsystem 1315.

In some embodiments, 3D/Media subsystem 1315 includes logic for executing threads spawned by 3D pipeline 1312 and media pipeline 1316. In one embodiment, the pipelines send thread execution requests to 3D/Media subsystem 1315, which includes thread dispatch logic for arbitrating and dispatching the various requests to available thread execution resources. The execution resources include an array of graphics execution units to process the 3D and media threads. In some embodiments, 3D/Media subsystem 1315 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: decode circuitry to decode an instruction to determine whether Converged Cryptographic Engine (CCE) circuitry is enabled; and execution circuitry to execute the instruction to program a plurality of keys in response to a determination that the CCE circuitry is enabled, wherein the CCE circuitry is to perform all encryption and all decryption of data to be transferred between a memory and a storage device based at least in part on at least one of the plurality of keys. Example 2 includes the apparatus of example 1, wherein the storage device is coupled to the memory via a System On Chip (SOC) device, wherein the CCE circuitry is coupled between an input output memory management unit of a System On Chip (SOC) device and the memory. Example 3 includes the apparatus of example 1, wherein the CCE circuitry is to perform the decryption of data read from the memory based at least in part on a key associated with a key identifier of a physical address of the data read from the memory, wherein the CCE circuitry is to encrypt the decrypted data read from the memory based at least in part on a storage key prior to storage of the encrypted data in the storage device. Example 4 includes the apparatus of example 3, wherein the key identifier comprises a plurality of bits from the physical address. Example 5 includes the apparatus of example 3, wherein the storage key is to be stored in a key table. Example 6 includes the apparatus of example 1, wherein the CCE circuitry is to perform the decryption of data read from the storage device based at least in part on a storage key, wherein the CCE circuitry is to encrypt the decrypted data read from the storage device based at least in part on a key identifier of a physical address of the data read from the storage device to generate re-encrypted data prior to storage of the re-encrypted data in the memory. Example 7 includes the apparatus of example 6, wherein the key identifier comprises a plurality of bits from the physical address. Example 8 includes the apparatus of example 6, wherein the storage key is to be stored in a key table.

Example 9 includes an apparatus comprising: Converged Cryptographic Engine (CCE) circuitry to perform all encryption and all decryption of data to be transferred between a memory and a storage device, wherein the storage device is coupled to the memory via a System On Chip (SOC) device, wherein the CCE circuitry is coupled between an input output memory management unit of a System On Chip (SOC) device and the memory. Example 10 includes the apparatus of example 9, wherein the CCE circuitry is to perform the decryption of data read from the memory based at least in part on a key associated with a key identifier of a physical address of the data read from the memory, wherein the CCE circuitry is to encrypt the decrypted data read from the memory based at least in part on a storage key prior to storage of the encrypted data in the storage device. Example 11 includes the apparatus of example 10, wherein the key identifier comprises a plurality of bits from the physical address. Example 12 includes the apparatus of example 10, wherein the storage key is to be stored in a key table. Example 13 includes the apparatus of example 9, wherein the CCE circuitry is to perform the decryption of data read from the storage device based at least in part on a storage key, wherein the CCE circuitry is to encrypt the decrypted data read from the storage device based at least in part on a key identifier of a physical address of the data read from the storage device to generate re-encrypted data prior to storage of the re-encrypted data in the memory. Example 14 includes the apparatus of example 13, wherein the key identifier comprises a plurality of bits from the physical address. Example 15 includes the apparatus of example 13, wherein the storage key is to be stored in a key table. Example 16 includes the apparatus of example 9, wherein the CCE circuitry is to encrypt or decrypt the data based on an Advanced Encryption Standard (AES)-XEX Tweakable block cipher with Ciphertext Stealing (XTS). Example 17 includes the apparatus of example 9, wherein the CCE circuitry is to encrypt or decrypt the data based on an Advanced Encryption Standard (AES)-Galois/Counter Mode (GCM). Example 18 includes the apparatus of example 9, wherein the memory comprises a dynamic random access memory. Example 19 includes the apparatus of example 9, wherein the storage device comprises a Non-Volatile Memory (NVM) drive. Example 20 includes the apparatus of example 19, wherein the NVM drive operates in accordance with NVM express protocol.

Example 21 includes one or more non-transitory computer-readable media comprising one or more instructions that when executed on at least one processor configure the at least one processor to perform one or more operations to: determine whether Converged Cryptographic Engine (CCE) circuitry is enabled based on decoding of an instruction; and program a plurality of keys in response to execution of the instruction after a determination that the CCE circuitry is enabled, wherein the CCE circuitry is to perform all encryption and all decryption of data to be transferred between a memory and a storage device based at least in part on at least one of the plurality of keys. Example 22 includes the one or more computer-readable media of example 21, further comprising one or more instructions that when executed on the at least one processor configure the at least one processor to perform one or more operations to cause the CCE circuitry to perform the decryption of data read from the memory based at least in part on a key associated with a key identifier of a physical address of the data read from the memory, wherein the CCE circuitry is to encrypt the decrypted data read from the memory based at least in part on a storage key prior to storage of the encrypted data in the storage device. Example 23 includes the one or more computer-readable media of example 22, wherein the key identifier comprises a plurality of bits from the physical address. Example 24 includes the one or more computer-readable media of example 22, further comprising one or more instructions that when executed on the at least one processor configure the at least one processor to perform one or more operations to cause storage of the storage key in a key table. Example 25 includes the one or more computer-readable media of example 21, further comprising one or more instructions that when executed on the at least one processor configure the at least one processor to perform one or more operations to cause the CCE circuitry to perform the decryption of data read from the storage device based at least in part on a storage key, wherein the CCE circuitry is to encrypt the decrypted data read from the storage device based at least in part on a key identifier of a physical address of the data read from the storage device to generate re-encrypted data prior to storage of the re-encrypted data in the memory.

Example 26 includes an apparatus comprising means to perform a method as set forth in any preceding example. Example 27 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
decode circuitry to decode an instruction to determine whether Converged Cryptographic Engine (CCE) circuitry is enabled; and
execution circuitry to execute the instruction to program a plurality of keys in response to a determination that the CCE circuitry is enabled,
wherein the CCE circuitry is to perform all encryption and all decryption of data to be transferred between a memory and a storage device based at least in part on at least one of the plurality of keys, wherein the storage device is coupled to the memory via a System On Chip (SOC) device, wherein the CCE circuitry is to encrypt or decrypt data based at least in part on a storage key, wherein the storage key is to be stored in a key table of the CCE circuitry, and wherein the storage key is searchable from the key table based on an entry of a key lookup table, and wherein the entry of the key lookup table includes a key identifier of a physical address of the data read from the memory or storage device.

2. The apparatus of claim 1, wherein the CCE circuitry is coupled between an input output memory management unit of the SOC device and the memory.

3. The apparatus of claim 1, wherein the CCE circuitry is to perform the decryption of data read from the memory based at least in part on a key associated with the key identifier of the physical address of the data read from the memory, wherein the CCE circuitry is to encrypt the decrypted data read from the memory based at least in part on the storage key prior to storage of the encrypted data in the storage device.

4. The apparatus of claim 3, wherein the key identifier comprises a plurality of bits from the physical address.

5. The apparatus of claim 1, wherein the CCE circuitry is to perform the decryption of data read from the storage device based at least in part on the storage key, wherein the CCE circuitry is to encrypt the decrypted data read from the storage device based at least in part on the key identifier of the physical address of the data read from the storage device to generate re-encrypted data prior to storage of the re-encrypted data in the memory.

6. An apparatus comprising:
Converged Cryptographic Engine (CCE) circuitry to perform all encryption and all decryption of data to be transferred between a memory and a storage device, wherein the storage device is coupled to the memory via a System On Chip (SOC) device,
wherein the CCE circuitry is coupled between an input output memory management unit of the SOC device and the memory, wherein the CCE circuitry is to encrypt or decrypt data based at least in part on a storage key, wherein the storage key is to be stored in a key table of the CCE circuitry, and wherein the storage key is searchable from the key table based on an entry of a key lookup table, and wherein the entry of the key lookup table includes a key identifier of a physical address of the data read from the memory or storage device.

7. The apparatus of claim 6, wherein the CCE circuitry is to perform the decryption of data read from the memory based at least in part on a key associated with the key identifier of the physical address of the data read from the memory, wherein the CCE circuitry is to encrypt the decrypted data read from the memory based at least in part on the storage key prior to storage of the encrypted data in the storage device.

8. The apparatus of claim 6, wherein the key identifier comprises a plurality of bits from the physical address.

9. The apparatus of claim 6, wherein the CCE circuitry is to perform the decryption of data read from the storage device based at least in part on the storage key, wherein the CCE circuitry is to encrypt the decrypted data read from the storage device based at least in part on the key identifier of the physical address of the data read from the storage device to generate re-encrypted data prior to storage of the re-encrypted data in the memory.

10. The apparatus of claim 6, wherein the CCE circuitry is to encrypt or decrypt the data based on an Advanced Encryption Standard (AES)-XEX Tweakable block cipher with Ciphertext Stealing (XTS).

11. The apparatus of claim 6, wherein the CCE circuitry is to encrypt or decrypt the data based on an Advanced Encryption Standard (AES)-Galois/Counter Mode (GCM).

12. The apparatus of claim 6, wherein the memory comprises a dynamic random-access memory.

13. The apparatus of claim 6, wherein the storage device comprises a Non-Volatile Memory (NVM) drive.

14. The apparatus of claim 13, wherein the NVM drive operates in accordance with NVM express protocol.

15. One or more non-transitory computer-readable media comprising one or more instructions that when executed on at least one processor configure the at least one processor to perform one or more operations to:
determine whether Converged Cryptographic Engine (CCE) circuitry is enabled based on decoding of an instruction; and
program a plurality of keys in response to execution of the instruction after a determination that the CCE circuitry is enabled,
wherein the CCE circuitry is to perform all encryption and all decryption of data to be transferred between a memory and a storage device based at least in part on at least one of the plurality of keys, wherein the storage device is coupled to the memory via a System On Chip (SOC) device, wherein the CCE circuitry is to encrypt or decrypt data based at least in part on a storage key, wherein the storage key is to be stored in a key table of the CCE circuitry, and wherein the storage key is searchable from the key table based on an entry of a key lookup table, and wherein the entry of the key lookup table includes a key identifier of a physical address of the data read from the memory or storage device.

16. The one or more computer-readable media of claim 15, further comprising one or more instructions that when executed on the at least one processor configure the at least one processor to perform one or more operations to cause the CCE circuitry to perform the decryption of data read from the memory based at least in part on a key associated with the key identifier of the physical address of the data read from the memory, wherein the CCE circuitry is to encrypt the decrypted data read from the memory based at least in part on the storage key prior to storage of the encrypted data in the storage device.

17. The one or more computer-readable media of claim 15, wherein the key identifier comprises a plurality of bits from the physical address.

18. The one or more computer-readable media of claim 15, further comprising one or more instructions that when executed on the at least one processor configure the at least one processor to perform one or more operations to cause the CCE circuitry to perform the decryption of data read from the storage device based at least in part on the storage key, wherein the CCE circuitry is to encrypt the decrypted data read from the storage device based at least in part on the key identifier of the physical address of the data read from the storage device to generate re-encrypted data prior to storage of the re-encrypted data in the memory.

* * * * *